US011320084B2

(12) United States Patent
Jadani et al.

(10) Patent No.: US 11,320,084 B2
(45) Date of Patent: May 3, 2022

(54) SYSTEMS AND METHODS FOR REHABILITATION OF WATER CONDUITS AND OTHER CONDUITS

(71) Applicant: SANEXEN ENVIRONMENTAL SERVICES INC., Brossard (CA)

(72) Inventors: Yassir Jadani, Brossard (CA); Gilles Gagnon, Repentigny (CA); Martin Bureau, Montreal (CA)

(73) Assignee: SANEXEN SERVICES ENVIRONNEMENTAUX INC.

( * ) Notice: Subject to any disclaimer, the term of this patent is extended or adjusted under 35 U.S.C. 154(b) by 0 days.

(21) Appl. No.: 16/486,554

(22) PCT Filed: Oct. 16, 2018

(86) PCT No.: PCT/CA2018/051299
§ 371 (c)(1),
(2) Date: Aug. 16, 2019

(87) PCT Pub. No.: WO2020/077432
PCT Pub. Date: Apr. 23, 2020

(65) Prior Publication Data
US 2021/0332929 A1    Oct. 28, 2021

(51) Int. Cl.
*F16L 55/165* (2006.01)
*B29C 63/00* (2006.01)
(Continued)

(52) U.S. Cl.
CPC ...... *F16L 55/1653* (2013.01); *B29C 63/0052* (2013.01); *B29C 63/341* (2013.01);
(Continued)

(58) Field of Classification Search
CPC ... F16L 55/16455; F16L 55/163; F16L 55/16; F16L 55/18; F16L 2101/30; B29C 63/36; B29C 35/02
(Continued)

(56) References Cited

U.S. PATENT DOCUMENTS 4,836,715 A * 6/1989 Wood ................ F16L 55/1656
138/98
5,374,174 A * 12/1994 Long, Jr. ................ B29C 63/36
156/287
(Continued)

FOREIGN PATENT DOCUMENTS

KR      101474298       12/2014
KR      101515934       5/2015

OTHER PUBLICATIONS

International Search Report, PCT/CA2018/051299, dated Jun. 17, 2019.

*Primary Examiner* — Patrick F Brinson
(74) *Attorney, Agent, or Firm* — Lavery, De Billy, LLP; Gwendoline Bruneau

(57) ABSTRACT

Methods and systems for installation of a liner inside a conduit (e.g., water pipe) to transport a fluid (e.g., potable water) to rehabilitate the conduit, in which the liner can be installed, and thus the conduit can be rehabilitated, more efficiently, including, for example, by further reducing an extent of digging that may have to be done, by testing more readily (e.g., pressure-testing for watertightness or other fluid-tightness once installed), and/or by adapting to a cross-sectional size of the conduit. Also, the liner may be thinner, interact better (e.g., less) with the fluid flowing through the conduit, and/or be otherwise designed to enhance its use and performance.

12 Claims, 11 Drawing Sheets

(51) Int. Cl.
    *B29C 63/34*     (2006.01)
    *G01M 3/28*     (2006.01)

(52) U.S. Cl.
    CPC ........ *B29C 63/346* (2013.01); *F16L 55/1656* (2013.01); *G01M 3/2815* (2013.01)

(58) Field of Classification Search
    USPC ................. 138/98, 97; 264/36.17, 36.16; 405/184.2, 150.1
    See application file for complete search history.

(56) References Cited

U.S. PATENT DOCUMENTS

| | | | | |
|---|---|---|---|---|
| 5,634,743 | A * | 6/1997 | Chandler | F16L 55/1651 138/98 |
| 7,669,614 | B2 * | 3/2010 | Cohen | F16L 55/16455 138/98 |
| 7,841,366 | B2 * | 11/2010 | Bryant | F16L 55/16455 138/98 |
| 9,188,269 | B2 * | 11/2015 | Hairston | B29C 57/005 |
| 9,261,219 | B2 * | 2/2016 | Warren | F16L 55/179 |
| 9,371,950 | B2 * | 6/2016 | Hairston | B29C 57/005 |
| 9,453,597 | B2 * | 9/2016 | Delaney | B29C 63/36 |
| 9,651,189 | B2 * | 5/2017 | Karunakaran | E03F 5/025 |
| 9,874,302 | B2 * | 1/2018 | Hairston | B29C 63/34 |
| 2003/0209823 | A1 * | 11/2003 | Waring | F16L 55/18 264/36.17 |
| 2008/0213047 | A1 * | 9/2008 | Bryant | F16L 55/16455 405/184.2 |
| 2008/0271802 | A1 * | 11/2008 | Kamiyama | F16L 55/1656 138/98 |
| 2009/0092173 | A1 * | 4/2009 | Glombitza | G01K 11/32 374/161 |
| 2012/0012217 | A1 | 1/2012 | Hairston et al. | |
| 2019/0264855 | A1 * | 8/2019 | Mathey | F16L 55/1654 |

* cited by examiner

SYSTEMS AND METHODS FOR REHABILITATION OF WATER CONDUITS AND OTHER CONDUITS

FIELD

This disclosure generally relates to rehabilitating conduits such as water conduits and/or other conduits.

BACKGROUND

Conduits, such as those of aqueducts, sewers, pipelines, etc., are used to transport fluids such as potable water, wastewater, gas, oil, fuel, etc.

As conduits become used, maintenance, replacement or rehabilitation of the conduits is required. In some circumstances, replacing the used conduits by removing them and installing new conduits may be expensive, complicated and/or impractical, especially when hard to reach, such as water pipes that are underground in urban areas.

In these circumstances, cured-in-place pipe (CIPP) technology may be used to rehabilitate conduits without removing old conduits entirely. In some cases, CIPP installation may be trenchless, avoiding significant disturbances to local traffic and movements of residents, as well as costly dig-and-replace works, not to mention associated negative environmental consequences. CIPP technologies thus include trenchless solutions for rehabilitating water mains (and other types of conduits) from within, by means of accessing a pipe section to be rehabilitated from both ends through access pits (often at valve chambers that are replaced at the same time) and inserting, either by inversion (like inserting a reversed sock into the conduit) or pulling methods, a polymeric resin-impregnated tube that will be cured in place. However, because large trenches and/or holes may be required to be dug and/or multiple time-consuming manipulations and other operations are required during CIPP installation, this method may still be costly and/or inefficient in some cases.

Liners used for CIPP technology may also sometimes detrimentally affect fluids flowing in conduits that they rehabilitate (e.g., by reducing flow or otherwise undesirably interacting with the fluids).

For these and/or other reasons, there is a need for improvements directed to rehabilitation of conduits.

SUMMARY

In accordance with various aspects, this disclosure relates to installation of a liner inside a conduit (e.g., water pipe) to transport a fluid (e.g., potable water) to rehabilitate the conduit, in which the liner can be installed, and thus the conduit can be rehabilitated, more efficiently, including, for example, by further reducing an extent of digging that may have to be done, by testing more readily (e.g., pressure-testing for watertightness or other fluid-tightness once installed), and/or by adapting to a cross-sectional size of the conduit. Also, the liner may be thinner, interact better (e.g., less) with the fluid flowing through the conduit, and/or be otherwise designed to enhance its use and performance.

For example, in accordance with an aspect, this disclosure relates to an apparatus for installing a liner inside a conduit to transport a fluid, the liner being curable inside the conduit. The apparatus comprises a first end device configured to be connected to the liner adjacent to a first longitudinal end of the conduit. The apparatus comprises a second end device configured to be connected to the liner adjacent to a second longitudinal end of the conduit spaced from the first longitudinal end of the conduit. The first end device and the second end device are configured to put liner-installing material including a liner-installing fluid inside the liner. The first end device and the second end device are configured to allow curing of the liner inside the conduit and hydrostatic pressure testing of the liner while the first end device and the second end device are connected to the liner.

In accordance with another aspect, this disclosure relates to a method for installing a liner inside a conduit to transport a fluid, the liner being curable inside the conduit. The method comprises: connecting a first end device to the liner adjacent to a first longitudinal end of the conduit; connecting a second end device to the liner adjacent to a second longitudinal end of the conduit spaced from the first longitudinal end of the conduit; using the first end device and the second end device to put liner-installing material including a liner-installing fluid inside the liner; and curing the liner inside the conduit and performing hydrostatic pressure testing of the liner while the first end device and the second end device are connected to the liner.

In accordance with another aspect, this disclosure relates to an apparatus for installing a liner inside a conduit to transport a fluid, the liner being curable inside the conduit. The apparatus comprises a first end device configured to be connected to the liner adjacent to a first longitudinal end of the conduit; and a second end device configured to be connected to the liner adjacent to a second longitudinal end of the conduit spaced from the first longitudinal end of the conduit. The first end device and the second end device are configured to put liner-installing material including a liner-installing fluid inside the liner. The first end device and the second end device are configured to allow curing of the liner inside the conduit and hydrostatic pressure testing of the liner without disconnecting the first end device and the second end device from the liner.

In accordance with another aspect, this disclosure relates to a method for installing a liner inside a conduit to transport a fluid, the liner being curable inside the conduit. The method comprises: connecting a first end device to the liner adjacent to a first longitudinal end of the conduit; connecting a second end device to the liner adjacent to a second longitudinal end of the conduit spaced from the first longitudinal end of the conduit; using the first end device and the second end device to put liner-installing material including a liner-installing fluid inside the liner; and curing the liner inside the conduit and performing hydrostatic pressure testing of the liner without disconnecting the first end device and the second end device from the liner.

In accordance with another aspect, this disclosure relates to an end device for installing a liner inside a conduit to transport a fluid, the liner being curable inside the conduit. The end device comprises a connector configured to connect the end device to the liner adjacent to a longitudinal end of the conduit; and a cavity configured to put liner-installing material including a liner-installing fluid inside the liner. The end device is configured to allow curing of the liner inside the conduit and hydrostatic pressure testing of the liner while the end device is connected to the liner.

In accordance with another aspect, this disclosure relates to an apparatus for installing a liner inside a conduit to transport a fluid, the liner being curable inside the conduit. The apparatus comprises a first end device configured to be connected to the liner adjacent to a first longitudinal end of the conduit; and a second end device configured to be connected to the liner adjacent to a second longitudinal end of the conduit spaced from the first longitudinal end of the conduit. The first end device and the second end device are configured to put liner-installing material including a liner-installing fluid inside the liner. A longitudinal axis of the first end device is non-straight.

In accordance with another aspect, this disclosure relates to a method for installing a liner inside a conduit to transport a fluid, the liner being curable inside the conduit. The method comprises: connecting a first end device to the liner adjacent to a first longitudinal end of the conduit, a longitudinal axis of the first end device being non-straight; connecting a second end device to the liner adjacent to a second longitudinal end of the conduit spaced from the first longitudinal end of the conduit; using the first end device and the second end device to put liner-installing material including a liner-installing fluid inside the liner; and curing the liner inside the conduit.

In accordance with another aspect, this disclosure relates to an end device for installing a liner inside a conduit to transport a fluid, the liner being curable inside the conduit. The end device comprises a connector configured to connect the end device to the liner adjacent to a longitudinal end of the conduit; and a cavity configured to put liner-installing material including a liner-installing fluid inside the liner. The end device is configured to allow curing of the liner inside the conduit; and a longitudinal axis of the end device is non-straight.

In accordance with another aspect, this disclosure relates to an apparatus for installing a liner inside a conduit to transport a fluid, the liner being curable inside the conduit. The apparatus comprises a first end device configured to be connected to the liner adjacent to a first longitudinal end of the conduit; and a second end device configured to be connected to the liner adjacent to a second longitudinal end of the conduit spaced from the first longitudinal end of the conduit. The first end device and the second end device are configured to put liner-installing material including a liner-installing fluid inside the liner. The first end device comprises a proximal portion configured to be closer to the first longitudinal end of the conduit, a distal portion configured to be farther from the first longitudinal end of the conduit, and a bend between the proximal portion of the first end device and the distal portion of the first end device.

In accordance with another aspect, this disclosure relates to a method for installing a liner inside a conduit to transport a fluid, the liner being curable inside the conduit. The method comprises: connecting a first end device to the liner adjacent to a first longitudinal end of the conduit, the first end device comprising a proximal portion configured to be closer to the first longitudinal end of the conduit, a distal portion configured to be farther from the first longitudinal end of the conduit, and a bend between the proximal portion of the first end device and the distal portion of the first end device; connecting a second end device to the liner adjacent to a second longitudinal end of the conduit spaced from the first longitudinal end of the conduit; using the first end device and the second end device to put liner-installing material including a liner-installing fluid inside the liner; and curing the liner inside the conduit.

In accordance with another aspect, this disclosure relates to an end device for installing a liner inside a conduit to transport a fluid, the liner being curable inside the conduit. The end device comprises a connector configured to connect the end device to the liner adjacent to a longitudinal end of the conduit; and a cavity configured to put liner-installing material including a liner-installing fluid inside the liner. The end device is configured to allow curing of the liner inside the conduit. The end device comprises a proximal portion configured to be closer to the longitudinal end of the conduit, a distal portion configured to be farther from the longitudinal end of the conduit, and a bend between the proximal portion of the end device and the distal portion of the end device.

In accordance with another aspect, this disclosure relates to an apparatus for installing a liner inside a conduit to transport a fluid, the liner being curable inside the conduit. The apparatus comprises a first end device configured to be connected to the liner adjacent to a first longitudinal end of the conduit; and a second end device configured to be connected to the liner adjacent to a second longitudinal end of the conduit spaced from the first longitudinal end of the conduit. The first end device and the second end device are configured to put liner-installing material including a liner-installing fluid inside the liner. The first end device comprises a tapered part configured to engage the liner.

In accordance with another aspect, this disclosure relates to a method for installing a liner inside a conduit to transport a fluid, the liner being curable inside the conduit. The method comprises: connecting a first end device to the liner adjacent to a first longitudinal end of the conduit, the first end device comprising a tapered part configured to engage the liner; connecting a second end device to the liner adjacent to a second longitudinal end of the conduit spaced from the first longitudinal end of the conduit; using the first end device and the second end device to put liner-installing material including a liner-installing fluid inside the liner; and curing the liner inside the conduit.

In accordance with another aspect, this disclosure relates to an end device for installing a liner inside a conduit to transport a fluid, the liner being curable inside the conduit. The end device comprises a connector configured to connect the end device to the liner adjacent to a longitudinal end of the conduit; and a cavity configured to put liner-installing material including a liner-installing fluid inside the liner. The end device is configured to allow curing of the liner inside the conduit. The end device comprises a tapered part configured to engage the liner.

In accordance with another aspect, this disclosure relates to an apparatus for installing liners inside conduits to transport fluids, the conduits differing in cross-sectional size, each liner being curable inside a respective one of the conduits. The apparatus comprises: a first end device configured to be connected to the liner adjacent to a first longitudinal end of the respective one of the conduits; and a second end device configured to be connected to the liner adjacent to a second longitudinal end of the respective one of the conduits spaced from the first longitudinal end of the respective one of the conduits. The first end device and the second end device are configured to put liner-installing material including a liner-installing fluid inside the liner. The first end device and the second end device are usable with the conduits that differ in cross-sectional size.

In accordance with another aspect, this disclosure relates to a method for installing liners inside conduits to transport fluids, the conduits differing in cross-sectional size, each liner being curable inside a respective one of the conduits. The method comprises: connecting a first end device to a first one of the liners adjacent to a first longitudinal end of a first one of the conduits; connecting a second end device to the first one of the liners adjacent to a second longitudinal end of the first one of the conduits spaced from the first longitudinal end of the first one of the conduits; using the first end device and the second end device to put liner-installing material including a liner-installing fluid inside the first one of the liners in the first one of the conduits; curing the first one of the liners inside the first one of the conduits;

connecting the first end device to a second one of the liners adjacent to a first longitudinal end of a second one of the conduits; connecting the second end device to the second one of the liners adjacent to a second longitudinal end of the second one of the conduits spaced from the first longitudinal end of the second one of the conduits; using the first end device and the second end device to put liner-installing material including a liner-installing fluid inside the second one of the liners in the second one of the conduits; and curing the second one of the liners inside the second one of the conduits.

In accordance with another aspect, this disclosure relates to an apparatus for installing a liner inside a conduit to transport a fluid, the conduit being underground such that an access pit is to be dug to access the conduit, the liner being curable inside the conduit. The apparatus comprises: a first end device configured to be connected to the liner adjacent to a first longitudinal end of the conduit; and a second end device configured to be connected to the liner adjacent to a second longitudinal end of the conduit spaced from the first longitudinal end of the conduit. The first end device and the second end device are configured to put liner-installing material including a liner-installing fluid inside the liner. A horizontal dimension of the access pit parallel to a longitudinal axis of the conduit at the second longitudinal end of the conduit is no more than 3 meters.

In accordance with another aspect, this disclosure relates to a method for installing a liner inside a conduit to transport a fluid, the conduit being underground such that an access pit is to be dug to access the conduit, the liner being curable inside the conduit. The method comprises: connecting a first end device to the liner adjacent to a first longitudinal end of the conduit; connecting a second end device to the liner adjacent to a second longitudinal end of the conduit spaced from the first longitudinal end of the conduit; using the first end device and the second end device to put liner-installing material including a liner-installing fluid inside the liner; and curing the liner inside the conduit. A horizontal dimension of the access pit parallel to a longitudinal axis of the conduit at the second longitudinal end of the conduit is no more than 3 meters.

In accordance with another aspect, this disclosure relates to an end device for installing a liner inside a conduit to transport a fluid, the conduit being underground such that an access pit is to be dug to access the conduit, the liner being curable inside the conduit. The end device comprises: a connector configured to connect the end device to the liner adjacent to a longitudinal end of the conduit; and a cavity configured to put liner-installing material including a liner-installing fluid inside the liner. The end device is configured to allow curing of the liner inside the conduit. A horizontal dimension of the access pit parallel to a longitudinal axis of the conduit at the longitudinal end of the conduit is no more than 3 meters.

In accordance with another aspect, this disclosure relates to an apparatus for installing a liner inside a conduit to transport a fluid, the conduit being underground such that an access pit is to be dug to access the conduit, the liner being curable inside the conduit. The apparatus comprises a first end device configured to be connected to the liner adjacent to a first longitudinal end of the conduit; and a second end device configured to be connected to the liner adjacent to a second longitudinal end of the conduit spaced from the first longitudinal end of the conduit. The first end device and the second end device are configured to put liner-installing material including a liner-installing fluid inside the liner. A horizontal dimension of the access pit parallel to a longitudinal axis of the conduit at the second longitudinal end of the conduit is less than a path length of the second end device.

In accordance with another aspect, this disclosure relates to a method for installing a liner inside a conduit to transport a fluid, the conduit being underground such that an access pit is to be dug to access the conduit, the liner being curable inside the conduit. The method comprises: connecting a first end device to the liner adjacent to a first longitudinal end of the conduit; connecting a second end device to the liner adjacent to a second longitudinal end of the conduit spaced from the first longitudinal end of the conduit; using the first end device and the second end device to put liner-installing material including a liner-installing fluid inside the liner; and curing the liner inside the conduit. A horizontal dimension of the access pit parallel to a longitudinal axis of the conduit at the second longitudinal end of the conduit is less than a path length of the second end device.

In accordance with another aspect, this disclosure relates to an end device for installing a liner inside a conduit to transport a fluid, the conduit being underground such that an access pit is to be dug to access the conduit, the liner being curable inside the conduit. The end device comprises a connector configured to connect the end device to the liner adjacent to a longitudinal end of the conduit; and a cavity configured to put liner-installing material including a liner-installing fluid inside the liner. The end device is configured to allow curing of the liner inside the conduit. A horizontal dimension of the access pit parallel to a longitudinal axis of the conduit at the longitudinal end of the conduit is less than a path length of the end device.

In accordance with another aspect, this disclosure relates to a liner for lining a conduit to transport a fluid. The liner is curable inside the conduit. The liner has no more than 1% by weight of phenolic molecules.

In accordance with another aspect, this disclosure relates to a liner for lining a conduit to transport a fluid. The liner is curable inside the conduit. The liner is free of phenolic molecules.

In accordance with another aspect, this disclosure relates to a liner for lining a conduit to transport a fluid. The liner is curable inside the conduit. The liner is configured such that the fluid circulating through the conduit when the liner is installed accumulates no more than 100 ppb of derivatives of phenolic molecules.

In accordance with another aspect, this disclosure relates to a liner for lining a conduit to transport a fluid. The liner is curable inside the conduit. The liner is configured such that the fluid circulating through the conduit when the liner is installed accumulates no derivatives of phenolic molecules.

In accordance with another aspect, this disclosure relates to a liner for lining a conduit to transport a fluid. The liner is curable inside the conduit. The liner comprises fabric. A ratio of a thickness of the liner over an inner diameter of the conduit before installation of the liner is no more than 4%.

In accordance with another aspect, this disclosure relates to a liner for lining a conduit to transport a fluid. The liner is curable inside the conduit. The liner comprises fabric. The fabric comprises a ply of non-crimp fabric.

These and other aspects of this disclosure will now become apparent to those of ordinary skill in the art upon review of a description of embodiments that follows in conjunction with accompanying drawings.

BRIEF DESCRIPTION OF DRAWINGS

A detailed description of embodiments is provided below, by way of example only, with reference to drawings annexed hereto, in which.

Figure 1:
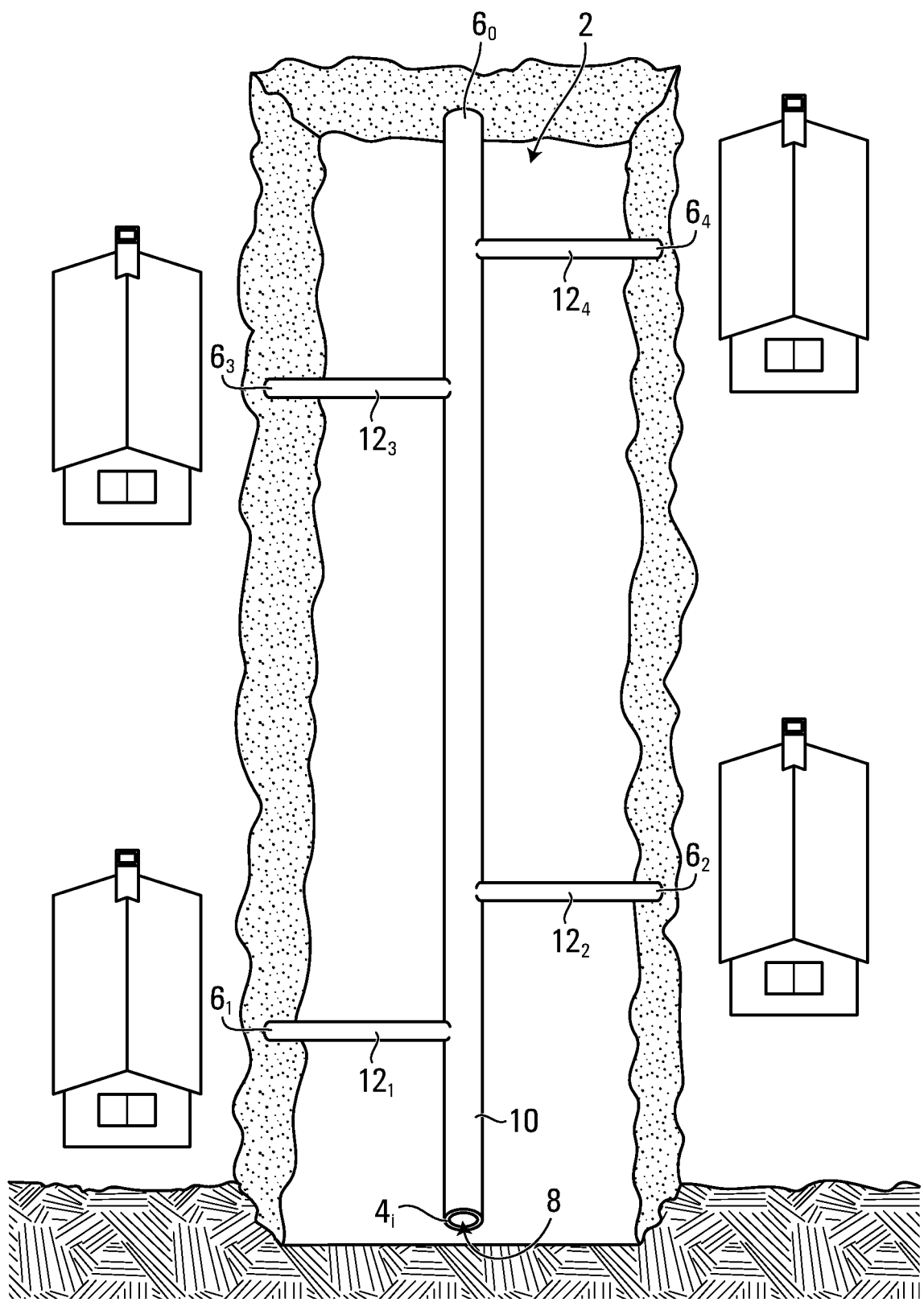
FIGS. 1 and 2 show an example of a fluid transport system in accordance with an embodiment.

In the drawings, embodiments are illustrated by way of example. It is to be expressly understood that the description and drawings are only for purposes of illustration and as an aid to understanding, and are not intended to be and should not be limitative.

DETAILED DESCRIPTION OF EMBODIMENTS

Figure 2:
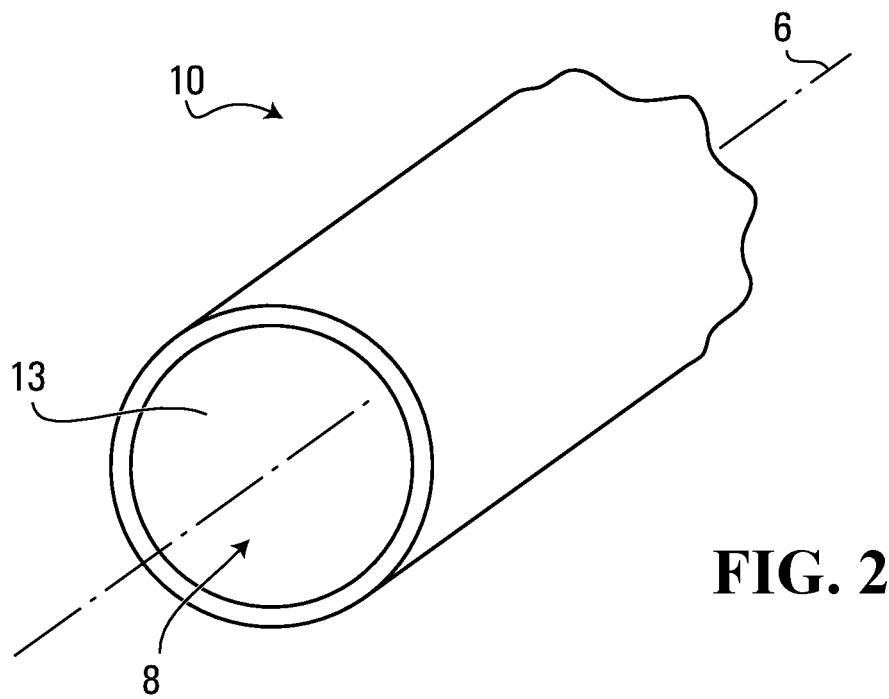

FIGS. 1 and 2 show an example of an embodiment of a fluid transport system 2 for transporting (i.e., conveying) a fluid 8, in which a liner installation apparatus 14 can be used to rehabilitate at least part of the fluid transport system 2. In this embodiment, the fluid transport system 2 comprises a plurality of conduits, including a main conduit 10 and auxiliary conduits $12_1$-$12_a$, as well as a plurality of inputs $4_1$-$4_I$ and outputs $6_1$-$6_O$ for transporting the fluid 8 from a given one of the inputs $4_1$-$4_I$ to a given one of the outputs $6_1$-$6_O$ via one or more of these conduits. More particularly, in this embodiment, the fluid 8 is water, in this case potable water, the fluid transport system 2 is an aqueduct, and the conduits 10, $12_1$-$12_a$ are water pipes. In this example, the aqueduct 2 is underground such that it is disposed beneath a ground surface 9 (e.g., buried at a predetermined depth), and the water pipe 10 is a water main (e.g., of a municipal infrastructure).

The water pipes 10, $12_1$-$12_a$ may corrode, wear, deteriorate or otherwise become used over time and may require maintenance, replacement or rehabilitation. In this example, as the water pipes 10, $12_1$-$12_a$ are underground, there may be a necessity to dig in order to replace, rehabilitate or otherwise execute maintenance on the water pipes 10, $12_1$-$12_a$. Because digging for rehabilitating the water pipes 10, $12_1$-$12_a$ may be less extensive than digging for replacing the water pipes 10, $12_1$-$12_a$, rehabilitating the water pipes 10, $12_1$-$12_a$ may be preferred.

Figure 3:
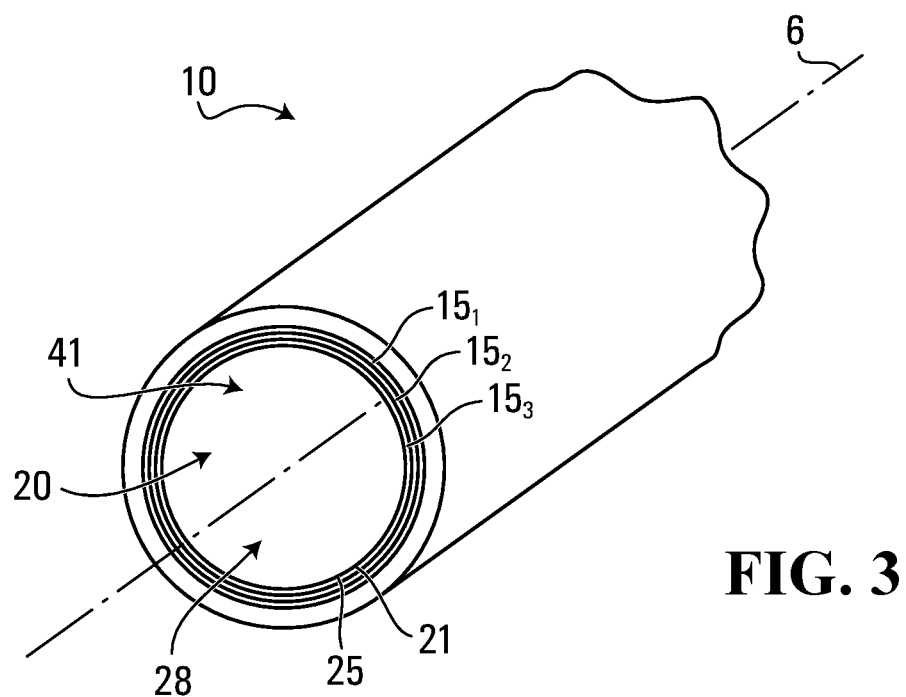
FIGS. 3 and 4 show a water pipe of the fluid transport system with a liner.
Figure 4:
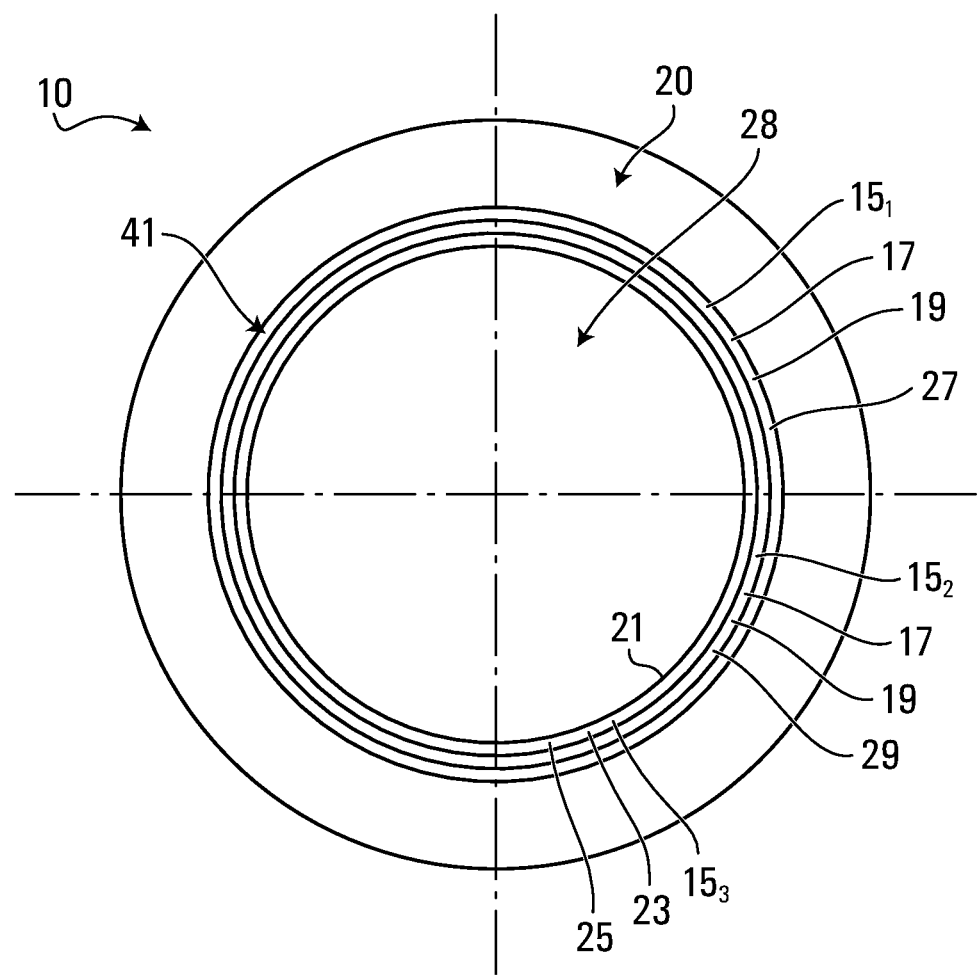
Figure 5:
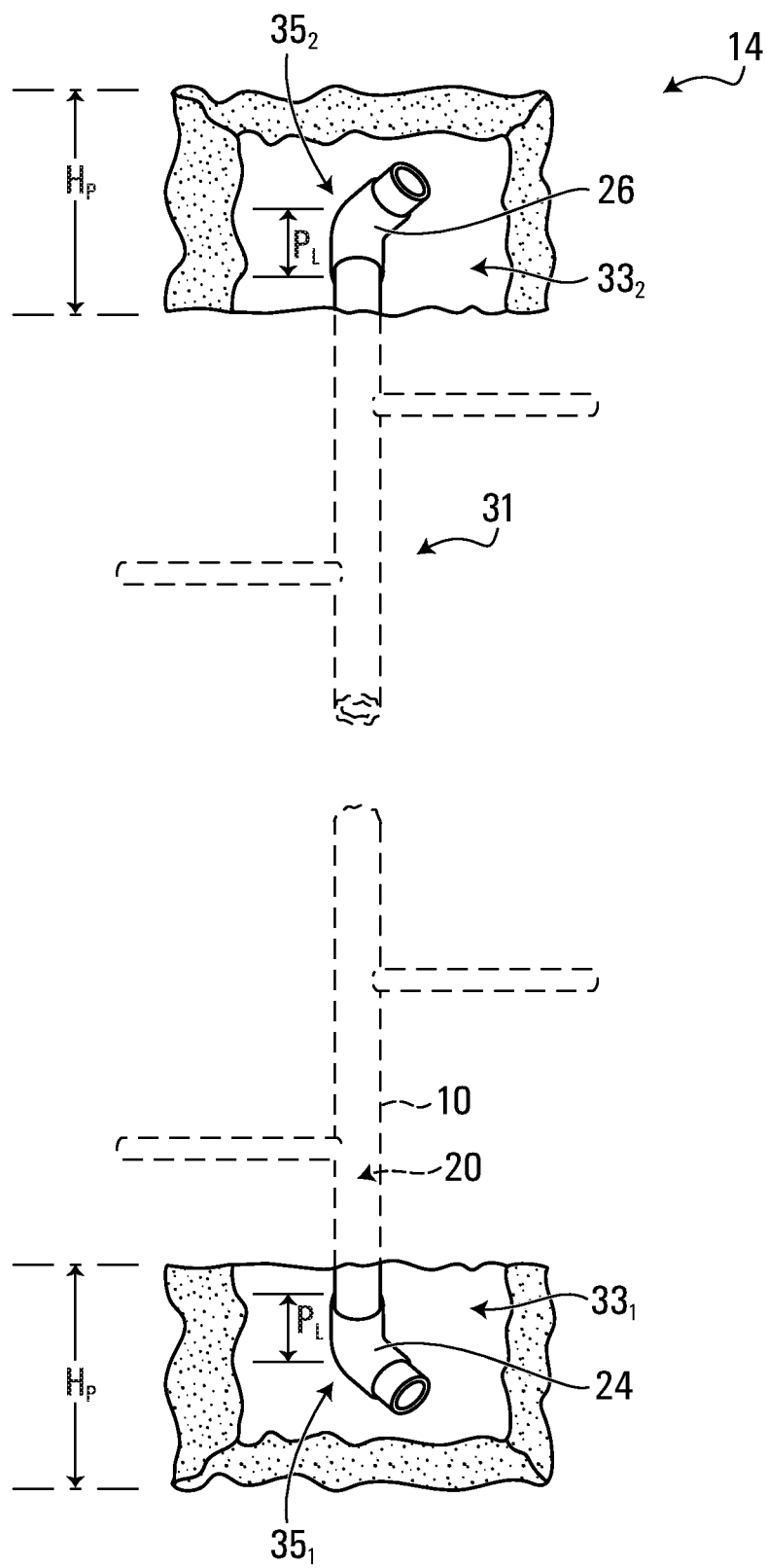
FIG. 5 shows the fluid transport system with a liner installation apparatus for installing the liner.

With additional reference to FIGS. 3 to 5, the liner installation apparatus 14 is used to rehabilitate a given one of the water pipes 10, $12_1$-$12_a$ by installing a liner 20 inside that water pipe. In this example, the liner 20 is installed inside the water pipe 10. This may notably reduce an extent of digging to access the water pipe 10, thereby reducing costs, duration and/or invasiveness of and/or otherwise facilitating a process for continued use of the water pipe 10. For instance, in this embodiment, the liner installation apparatus 14 is configured to install the liner 20 inside the water pipe 10 trenchlessly, i.e., without having to dig a trench along the water pipe 10.

As further discussed later, in this embodiment, the liner installation apparatus 14 allows the liner 20 to be installed, and thus the water pipe 10 to be rehabilitated, more efficiently, including, for example, by further reducing the extent of digging to be done, by testing more readily (e.g., pressure-testing for watertightness once installed), and/or by adapting to a cross-sectional size of the water pipe 10.

Also, in this embodiment, the liner 20 may be thinner, interact better (e.g., less) with the water 8 flowing through the water pipe 10, and/or be otherwise designed to enhance its use and performance.

When installed, the liner 20 is tubular and conforms to an inner surface 13 of the water pipe 10 so that the water 8 can flow through it. In this embodiment, the inner surface 13 of the water pipe 10 is substantially circular in cross-section so that a cross-section of the liner 20 is substantially circular. The liner 20 may be tubular with its cross-section having any other suitable shape (e.g., polygonal; partly straight and partly curved; comprising folded sections; etc.).

In this embodiment, the liner 20 is structural so that it constitutes a structural part of the water pipe 10 when installed inside the water pipe 10. More particularly, the liner 20 may be a stand-alone, i.e., may resist to pre-determined loads without the need of external support, such as from the water pipe 10. The pre-determined loads may include tensile loads, flexural loads and/or compressive loads, and may also include static loads and/or dynamic (i.e., varying) loads, such as a pressure exerted by the external environment of the water pipe 10 (e.g., above ground, soil compaction, etc.) and internal pressure exerted by the water 8 in the liner 20. For instance, in some embodiments, the liner 20 may withstand (i.e., resist to) an operating pressure of at least 50 psi, in some embodiments at least 100 psi, in some embodiments at least 150 psi, in some embodiments even more. In some embodiments, a material of the liner 20 may have a flexural modulus of elasticity of at least 1500 MPa, in some embodiments of at least 1724 MPa, in some embodiments of at least 2000 MPa, in some embodiments even more depending on the size of the water pipe 10. In some embodiments, a material of the liner 20 may have a flexural strength of at least 31 MPa, in some embodiments of at least 60 MPa, in some embodiments of at least 100 MPa, in some embodiments even more depending on the size of the water pipe 10. In some embodiments, a material of the liner 20 may have a tensile strength of at least 21 MPa, in some embodiments of at least 50 MPa, in some embodiments of at least 90 MPa, in some embodiments even more depending on the size of the water pipe 10. In some embodiments, the liner 20 may have a longitudinal deformation at break of at least 10%, in some embodiments at least 15%, in some embodiments at least 20%, in some embodiments even more. In some embodiments, the liner 20 may have a circumferential deformation at break of at least 5%, in some embodiments at least 10%, in some embodiments at least 15%, in some embodiments even more. The liner 20 may comply with the ASTM F1216 Standard, the ASTM 1743 Standard, the NSF/ANSI Standard 61, UL BNQ 3660-950, UK-DWI/Regulation 31 and/or AS/NZS 4020.

In this embodiment, the liner 20 is configured to ease insertion of the liner 20 into the water pipe 10. More particularly, the liner 20 may be relatively thin and flexible prior to the installation of the liner 20. For instance, in this embodiment, the liner 20 is anisotropic, i.e., has different mechanical properties in radial, tangential and axial directions. The anisotropic nature of the liner 20 may allow the liner 20 to have a reduced thickness. In some embodiments, a thickness TL of the liner 20 may be no more than 10 mm, in some embodiments no more than 6 mm, in some embodiments no more than 4 mm, in some embodiments no more than 3 mm, in some embodiments even less. In other embodiments, the liner 20 may be isotropic.

In some embodiments, the liner 20 may diminish friction and occurrence of cavitation between the water flow and the pipe 10. The liner 20 may thus be relatively smooth where it inferfaces with water.

In this embodiment, the liner 20 is impermeable, i.e., is watertight, and may not leak any water during operation.

In this example, the liner 20 and the liner installation apparatus 14 implement cured-in-place-piping (CIPP). That is, the liner 20 is cured inside the water pipe 10. More particularly, in this example, the liner 20 is flexible during its installation to conform to the inner surface 13 of the water pipe 10 and curable inside the water pipe 10 to rigidify itself and adhere to the inner surface 13 of the water pipe 10. The liner 20 may be curable in place inside the water pipe 10 by flowing water or another fluid (i.e., liquid, gas, and/or other media) within it at a certain temperature and at a certain pressure for a certain duration.

In this embodiment, the liner 20 is a composite multilayer liner that comprises a plurality of layers $15_1$-$15_3$ defining a cavity 28. More particularly, in this embodiment, each of the layers $15_1$, $15_2$ is a resin-impregnated fabric layer comprising fabric 17 impregnated with resin 19. The layer $15_3$ of the liner 20 comprises a membrane 23 including an inner surface 21 of the liner 20 and impermeable to liquid to isolate the water 8 from the layers $15_1$, $15_2$, including their resin 19.

In this embodiment, the layer $15_1$ is an outer layer of the liner 20 and can be referred to as an "outer jacket". The outer layer $15_1$ may have mechanical properties to enhance durability of the liner 20, to inhibit wear caused by internal and/or external stress, and to inhibit corrosion caused by the interaction with the external environment (e.g. ground, soil, etc.) of the liner 20. For instance, in-and-of itself (i.e., without any contribution or support from the layers $15_2$, $15_3$ and from the resin 19), the outer layer $15_1$ may withstand an operating pressure of at least 150 psi, in some embodiments of at least 300 psi, in some embodiments of at least 400 psi, in some embodiments even more.

In this embodiment, the outer layer $15_1$ is configured to ease insertion of the liner 20 into the water pipe 10. More particularly, the outer layer $15_1$ may be relatively thin and flexible prior to the installation of the liner 20. For instance, in some embodiments, a thickness $T_o$ of the outer layer $15_1$ may be no more than 3 mm, in some embodiments no more than 2 mm, in some embodiments no more than 1.5 mm, in some embodiments even less.

In this embodiment, the fabric 17 of the outer layer $15_1$ comprises a material 27. The material 27 may be comprised of fibers or assemblies of fibers in the form of rovings or yarns, which may present various levels of twisting for yarns tenacity and handability. The chemical nature of such material may be nylon, polyester, glass fiber, carbon fiber, aramid, linen, canvas, and/or any suitable material. The fabric 17 of the outer layer $15_1$ may be weaved in any suitable way and may have any suitable density. For instance, in some embodiments, yarns of the fabric 17 may have a density of at least 5,000 deniers, in some embodiments of at least 10,000 deniers, in some embodiments of at least 15,000 deniers, in some embodiments of at least 20,000 deniers, in some embodiments of at least 40,000 deniers. In some embodiments, also, rovings of the fabric 17 may have a density of at least 2,000 tex, in some embodiments of at least 4,000 tex, in some embodiments of at least 8,000 tex, in some embodiments of even more. In some embodiments, rovings (applying to glass fibers, carbon fibers and the like) may be used in one direction while yarns (applying to textile fibers) may be used in another direction.

In some embodiments, the fabric 17 may be woven such that it comprises a ply of woven fabric that may be weaved in any suitable way. For instance, the fabric 17 may comprise a plain weave, a satin weave, a basket weave, a twill weave, and so on.

In some embodiments, the fabric 17 may comprise a ply of non-crimp fabric (e.g., layers of non-crimped fibers stitched or laminated together). This may enhance properties of the liner 20 such that the liner 20 can be thinner, which may allow better water flow (e.g., volume and rate) in the water pipe 10. For example, in some embodiments, a ratio of the thickness $T_L$ of the liner 20 over an inner diameter of the water pipe 10 before installation of the liner 20 may be no more than 4%, in some cases no more than 3%, in some cases no more than 2%, and in some cases no more than 1%. This may be particularly useful when the water pipe 10 is larger in diameter. For instance, in some embodiments, where the inner diameter of the water pipe 10 before installation of the liner 20 is at least 24 inches, the ratio of the thickness TL of the liner 20 over the inner diameter of the water pipe 10 before installation of the liner 20 may be no more than 5%, in some cases no more than 3%, in some cases no more than 1%. As mentioned above, in some embodiments, the thickness TL of the liner 20 may be no more than 10 mm, in some embodiments no more than 6 mm, in some embodiments no more than 4 mm, in some embodiments no more than 3 mm, in some embodiments even less.

In this embodiment, the outer layer $15_1$ has an outer diameter that is slightly larger than an inner diameter of the water pipe 10, such as to ensure that the liner 20 occupies the volume of the water pipe 10 to a greater extent, that the liner 20 engages the inner surface 13 of the water pipe 10 over a greater surface, and that the water pipe 10 provides greater support to the liner 20.

In this embodiment, the layer $15_2$ is an inner layer of the liner 20, i.e., is disposed inwards from the outer layer $15_1$. The inner layer $15_2$ may also be referred to as an "inner jacket". In a similar fashion to the outer layer $15_1$, the inner layer $15_2$ may have mechanical properties to enhance durability of the liner 20, to inhibit wear caused by internal and/or external stress, and to inhibit corrosion caused by the interaction with the layers $15_1$, $15_3$. For instance, in-and-of itself (i.e., without any contribution or support from the layers $15_1$, $15_3$ and from the resin 19), the inner layer $15_2$ may withstand an operating pressure of at least 150 psi, in some embodiments of at least 300 psi, in some embodiments of at least 400 psi, in some embodiments even more.

In this embodiment, the inner layer $15_2$ is configured to ease insertion of the liner 20 into the water pipe 10. More particularly, the inner layer $15_2$ may be relatively thin and flexible prior to the installation of the liner 20. For instance, in some embodiments, a thickness $T_i$ of the inner layer $15_2$ may be no more than 3 mm, in some embodiments no more than 2 mm, in some embodiments no more than 1.5 mm, in some embodiments even more.

In this embodiment, the fabric 17 of the inner layer $15_2$ comprises a material 29. The material 29 may be comprised of fibers or assemblies of fibers in the form of rovings or yarns, which may present various levels of twisting for yarns tenacity and handability. The chemical nature of such material may be nylon, polyester, glass fiber, carbon fiber, aramid, linen, canvas, and/or any suitable material. The fabric 17 of the inner layer $15_2$ may be weaved in any suitable way and may have any suitable density. For instance, in some embodiments, yarns of the fabric 17 of the inner layer $15_2$ may have a density of at least 5,000 deniers, in some embodiments of at least 10,000 deniers, in some embodiments of at least 15,000 deniers, in some embodiments of at least 20,000 deniers, in some embodiments of at least 40,000 deniers. In some embodiments, also, rovings of the fabric 17 may have a density of at least 2,000 tex, in some embodiments of at least 6,000 tex, in some embodiments of at least 8,000 tex, in some embodiments of even more. In some embodiments, rovings (applying to glass fibers, carbon fibers and the like) may be used in one direction while yarns (applying to textile fibers) may be used in another direction.

In this embodiment, the fabric 17 is weaved in any suitable way. For instance, the fabric 17 may comprise a plain weave, a satin weave, a basket weave, a twill weave, and so on, or may comprise a non-crimp structure.

In this embodiment, the inner layer $15_2$ has an outer diameter which is equal or slightly inferior to an inner diameter of the outer layer $15_1$, such that when the layers $15_1$, $15_2$ extend, they typically interfere with each other, with their respective asperities interpenetrating the other layer's depressions and the outer layer $15_1$ provides a support to the inner layer $15_2$. In this embodiment, the materials 27, 29 of the fabric 17 of the layers $15_1$, $15_2$ are similar to each other and are weaved in a similar fashion, such as to react similarly to loads and pressures that would likely be applied upon them. In other embodiments, the materials 27, 29 of the fabric 17 of the layers $15_1$, $15_2$ may be different from one another and/or may be weaved differently.

Prior to and during the installation of the liner 20 in the water pipe 10, the resin 19 is in a liquid form and is uncured, such as to ease installation of the liner 20. At a later stage of the installation, the resin 19 may be cured and therefore solidified into its final shape. At that point, the resin 19 is configured to fix the layers $15_1$, $15_2$ into their extended position, to fix the layers $15_1$, $15_2$ relative to one another, to impermealize the layers $15_1$, $15_2$, and to provide structural support to the liner 20 in both tension, bending and compression. For instance, in some embodiments, the cured resin 19 may have a compressive strength of at least 30 MPa, in some embodiments of at least 50 MPa, in some embodiments of at least 75 MPa, in some embodiments even more.

In some embodiments, the resin 19 comprises a thermosetting polymer which may comprise polyester, vinylester, epoxy, and so on. The resin 19 may comprise any other suitable polymeric material in other embodiments.

The inner surface 21 of the liner 20 is configured to diminish a friction coefficient, enhance impermeability, reduce diffusion of chemicals between the liner 20 and the water 8, and comply with potable water requirements. In this embodiment, the membrane 23 comprises a material 25. The material 25 may be a polymer and may comprise, for example, thermoplastic polyurethane, polyethylene and other polyolefines, polyamide, and blends thereof, and PVC or CPVC, and/or the any suitable material.

In this embodiment, the membrane 23 is fastened by adhesion to the inner layer $15_2$ off-site (e.g., during manufacturing of the inner layer $15_2$). In other embodiments, the membrane 23 may be attached to the inner layer $15_2$ by other means and may be applied onto the remainder of the liner 20 prior to or after installation of the liner 20 into the water pipe 10.

The liner 20, once cured and installed in the water pipe 10, may have no more than a negligible level of, and in some cases be free of (i.e., lack), certain elements including phenolic molecules (e.g., hindered phenolic molecules), and/or may cause the water 8 circulating through the water pipe 10 lined with the liner 20 to have no more than a negligible level of, and in some cases be free of, these elements or derivatives thereof.

For example, in some embodiments, the liner 20 may have no more than 1% by weight of phenolic molecules (e.g., hindered phenolic molecules), in some cases no more than 0.1% by weight of phenolic molecules, and in some cases no more than 0.01% by weight of phenolic molecules. More particularly, in this embodiment, the liner 20 may be free of (i.e., lack) phenolic molecules, notably hindered phenolic molecules. That is, the liner 20 has 0% by weight of hindered phenolic molecules.

Thus, in some embodiments, the liner 20 may be configured such that the water 8 that circulates through the water pipe 10 once the liner 20 is installed accumulates no more than 100 µg of derivatives of phenolic molecules (e.g., hindered phenolic molecules) per liter of drinkable water 8, in some cases no more than 10 µg of derivatives of phenolic molecules per liter of drinkable water 8, in some cases no more than 1 µg of derivatives of phenolic molecules per liter of drinkable water 8, and in some cases no derivatives of phenolic molecules at all. Thus, in some embodiments, the liner 20 may be configured such that the water 8 circulating through the water pipe 10 once the liner 20 is installed has no more than 100 parts-per-billion (ppb) of derivatives of phenolic molecules (e.g., hindered phenolic molecules), in some cases no more than 10 ppb of derivatives of phenolic molecules, in some cases no more than 1 ppm of derivatives of phenolic molecules, and in some cases no derivatives of phenolic molecules at all. These derivatives of phenolic molecules (e.g., hindered phenolic molecules) that are negligible or absent from the drinkable water 8 may comprise 7,9-di-tert-butyl-1-oxaspiro(4,5)deca-6,9-diene-2,8-dione, designated by CAS (Chemical Abstracts Service) No. 82304-66-3, and which may sometimes be referred to as spirolactone.

To that end, in some embodiments, the liner 20 may be constructed without using substances (e.g., base ingredients, additives, etc.) for its layers $15_1$-$15_3$ that include such phenolic molecules (e.g., hindered phenolic molecules).

A precursor 31 of the liner 20 may be storable prior to installation of the liner 20 in a shape that is different from a final shape 41 of the liner 20 when installed (i.e., its tubular shape conforming to the inner surface 13 of the water pipe 10), and as such may undergo a transformation during installation of the liner 20. For instance, in this embodiment, the precursor 31 of the liner 20 includes the fabric 17 of each of the layers $15_1$-$15_3$, without their resin 19, that may be flatten and storable in a compact state such as a roll or box in a folded, flat configuration.

The liner 20 may be shaped into its final shape 41 during installation. In this embodiment, the liner installation apparatus 14 is configured to shape the liner 20 to conform to the inner surface 13 of the water pipe 10, including by conveying liner-installing material 50 inside the liner 20, which, in this embodiment, may comprise a fluid (e.g., water) flowing inside the liner 20 and one or more solid objects sent through the liner 20, as further discussed later.

In this embodiment, access pits $33_1$, $33_2$ are respectively dug at longitudinal ends $35_1$, $35_2$ of the water pipe 10 to be rehabilitated. More particularly, in this embodiment, a section 31 of the water pipe 10 to be rehabilitated is determined, and the ends $35_1$, $35_2$ of the water pipe 10 are those of the section 31 of the water pipe 10. This therefore allows the water pipe 10 to be rehabilitated in plural sections if very long. For instance, in some embodiments, a length of the section 31 of the water pipe 10 may be at least 50 m, in some cases at least 150 m, in some cases at least 300 m, and in some cases even more. In other embodiments, an entirety of the water pipe 10 may be rehabilitated at once such that the ends $35_1$, $35_2$ of the water pipe 10 are those of the entirety of the water pipe 10. In some cases, the water pipe 10 may be straight such that a longitudinal axis 6 of the water pipe 10 is straight. In other cases, the water pipe 10 may be nonstraight (e.g., comprise one or more bends or other curves) such that the longitudinal axis 6 of the water pipe 10 is nonstraight (e.g., bending or otherwise curving).

Figure 9:
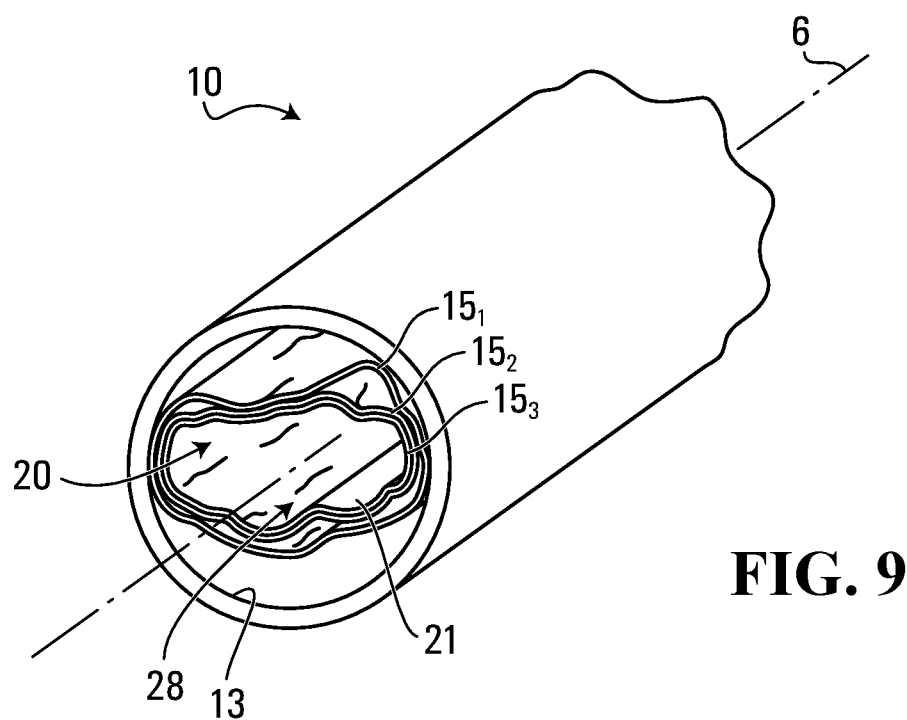
FIGS. 9 to 13 show the liner installation apparatus at various stages of a liner installation.
Figure 10:
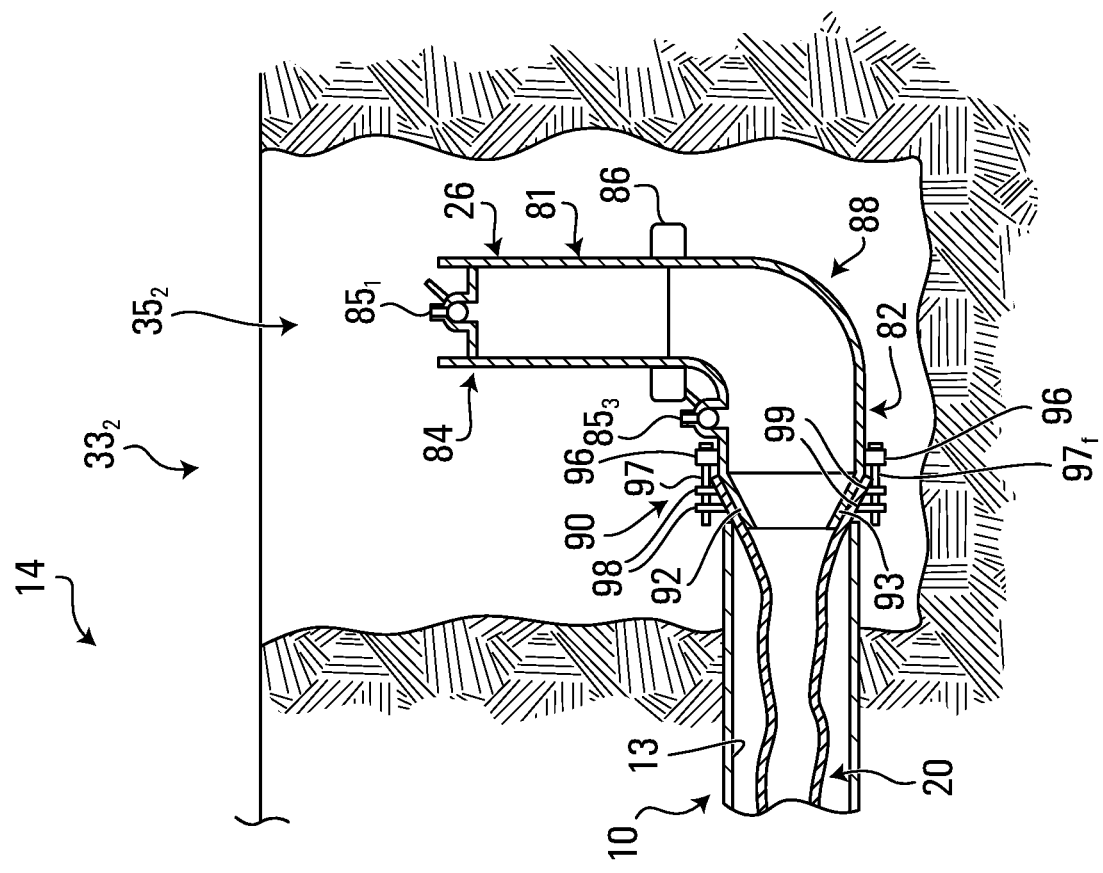
Figure 10:
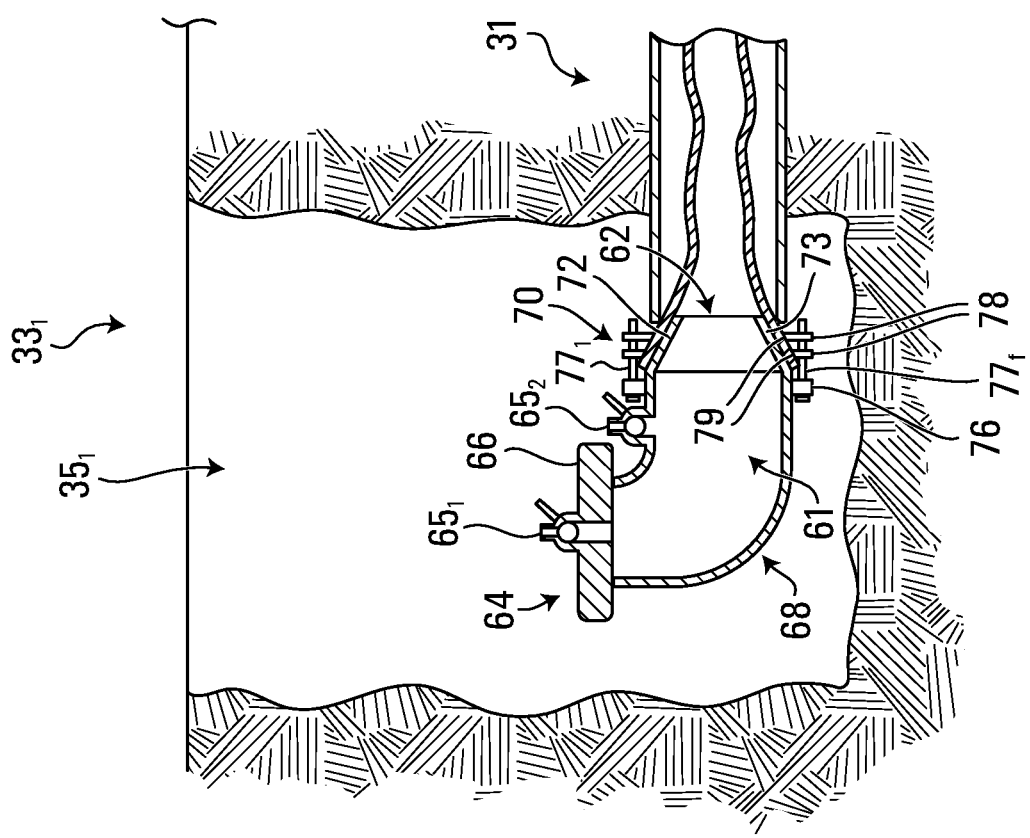
Figure 11:
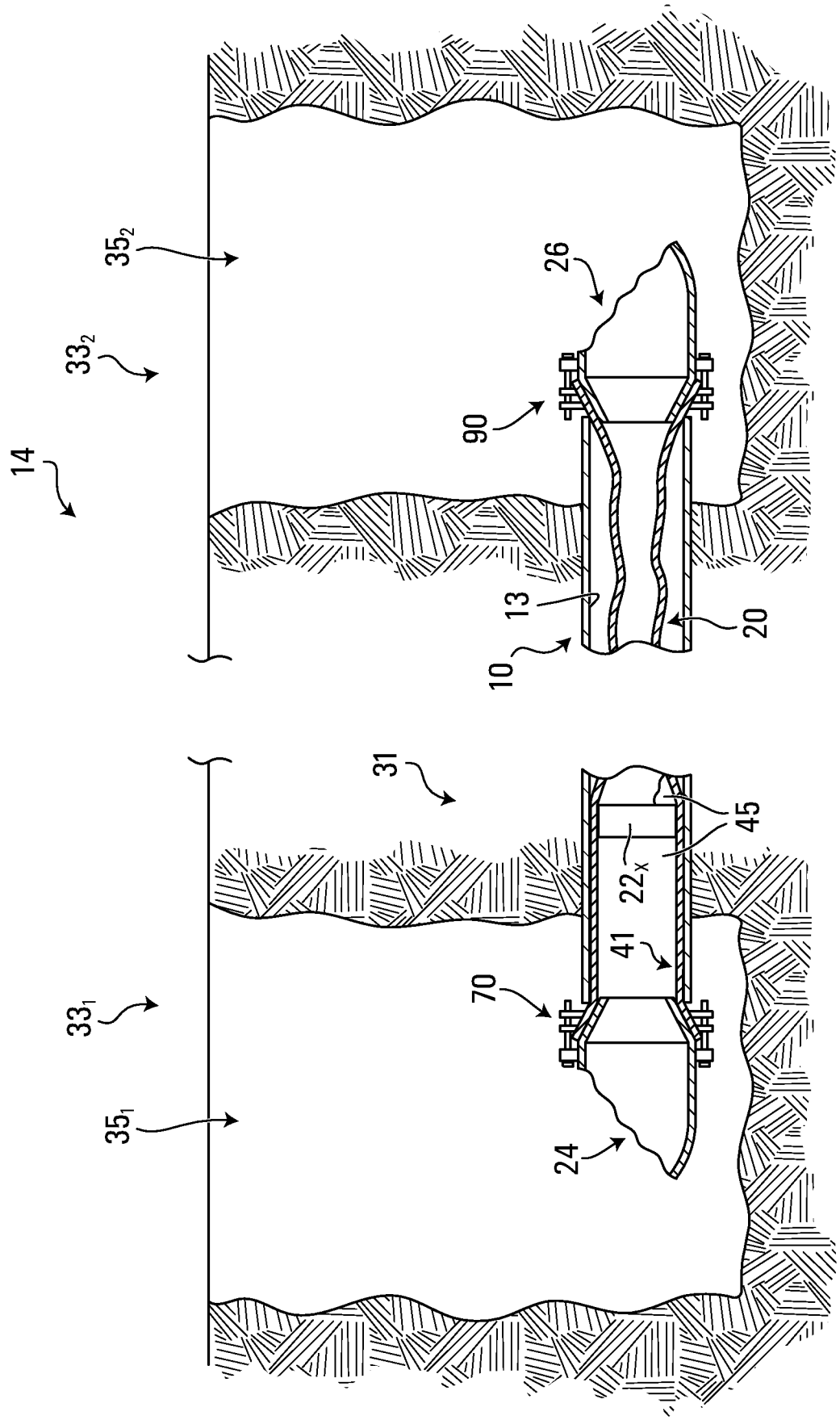

With additional reference to FIGS. 9 to 11, in this embodiment, the liner installation apparatus 14 is configured to convey the liner-installing material 50 through the liner 20 from the end $35_1$ of the water pipe 10 to the end $35_2$ so that the liner 20 conforms to the inner surface 13 of the water pipe 10.

More particularly, in this embodiment, the liner-installing material 50 includes a liner-installing fluid 45 and a plurality of expanders $22_1$-$22_E$.

In this example, the liner-installing fluid 45 is a liquid. In this case, the liquid 45 is water. This may be ambient or cool water at some point during installation or hot water at another point during installation, as discussed later. In other examples, the fluid 45 may be gas (e.g., steam).

Figure 8:
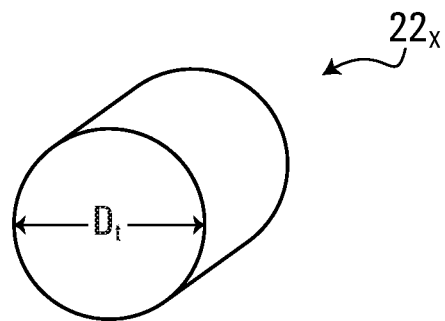
FIG. 8 shows a torpedo of the liner installation apparatus.

With additional reference to FIG. 8, each expander $22_x$, which will be referred to as a "torpedo" and may sometimes also be referred to as a "swab" or "pig", is a solid object that is configured to expand the liner 20 to conform the liner 20 to the inner surface 13 of the water pipe 10 as it travels along the water pipe 10. The liner installation apparatus 14 is configured to transmit the torpedo $22_x$ through the liner 20 from the end $35_1$ of the water pipe 10 to the end $35_2$ of the water pipe 10 to expand the liner 20 so that the liner 20 conforms to the inner surface 13 of the water pipe 10. In this example, the liner installation apparatus 14 is configured to transmit the torpedo $22_x$ by injecting the water 45 inside the liner 20 so that it pushes the torpedo 22 along the liner 20.

The torpedo $22_x$ may have any suitable shape. In this embodiment, the torpedo $22_x$ is cylinder shaped. The torpedo $22_x$ may have a diameter Dt that is slightly superior to an inner diameter of the liner 20, such that the torpedo $22_x$ is configured to travel through the main cavity 28 of the liner 20 without getting stuck and to expand the liner 20 into its final shape 41. To this end, also, the torpedo $22_x$ may have any suitable density. For instance, in some embodiments, the torpedo $22_x$ may have a density of 20-25 kg/m$^3$, in some embodiments between 30-35 kg/m$^3$, and in some embodiments about 40 kg/m$^3$. The torpedo may also have any suitable Indentation Force Deflection (IFD), i.e. load required to depress a 50 square inch compression platen into foam. For instance, in some embodiments, the torpedo $22_x$ may have a IFD between 100 N and 130 N, in some embodiments between 130 N and 150 N, and in some embodiments more than 150 N.

The torpedo $22_x$ may comprise any suitable material. In this embodiment, the torpedo $22_x$ comprises foam.

A position and a speed of the torpedo $22_x$ may be controlled to expand the liner 20 more efficiently. For instance, in this embodiment, a flow of the water 45 may be controlled to limit the speed of the torpedo $22_x$ in the liner 20 in order to obtain a greater area of contact between the liner 20 and the water pipe 10, to obtain a more uniform distribution of the resin 19 in the liner 20, to avoid the creation of multiple folds as a result of the intense friction between the torpedo $22_x$ and the liner 20, which would result in the torpedo $22_x$ being at least momentarily prevented from moving along the water pipe 10 and/or to avoid irregularities such as folds of the liner 20 in the water pipe 10.

Figure 6:
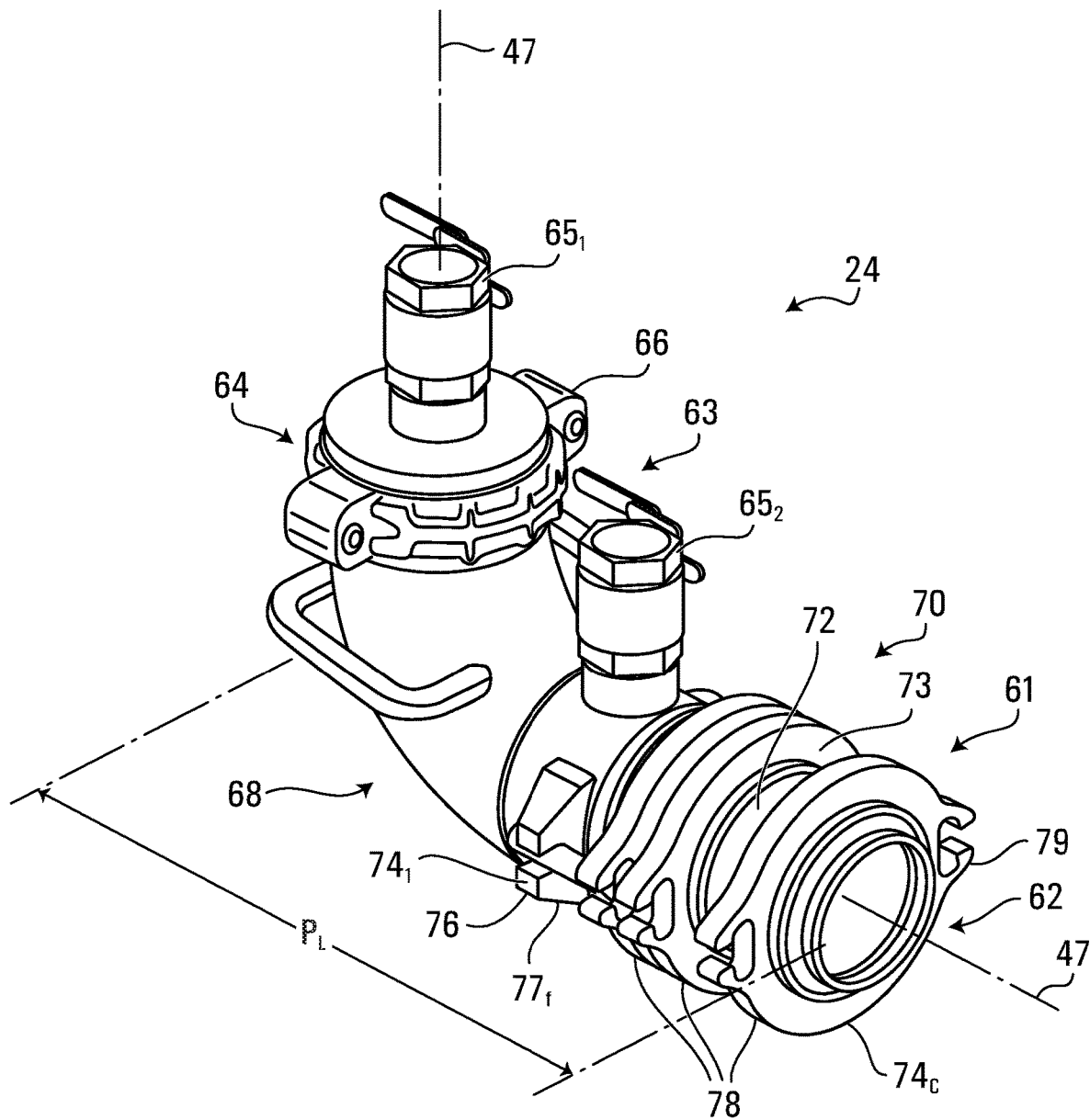
FIG. 6 shows a launcher of the liner installation apparatus.
Figure 7:
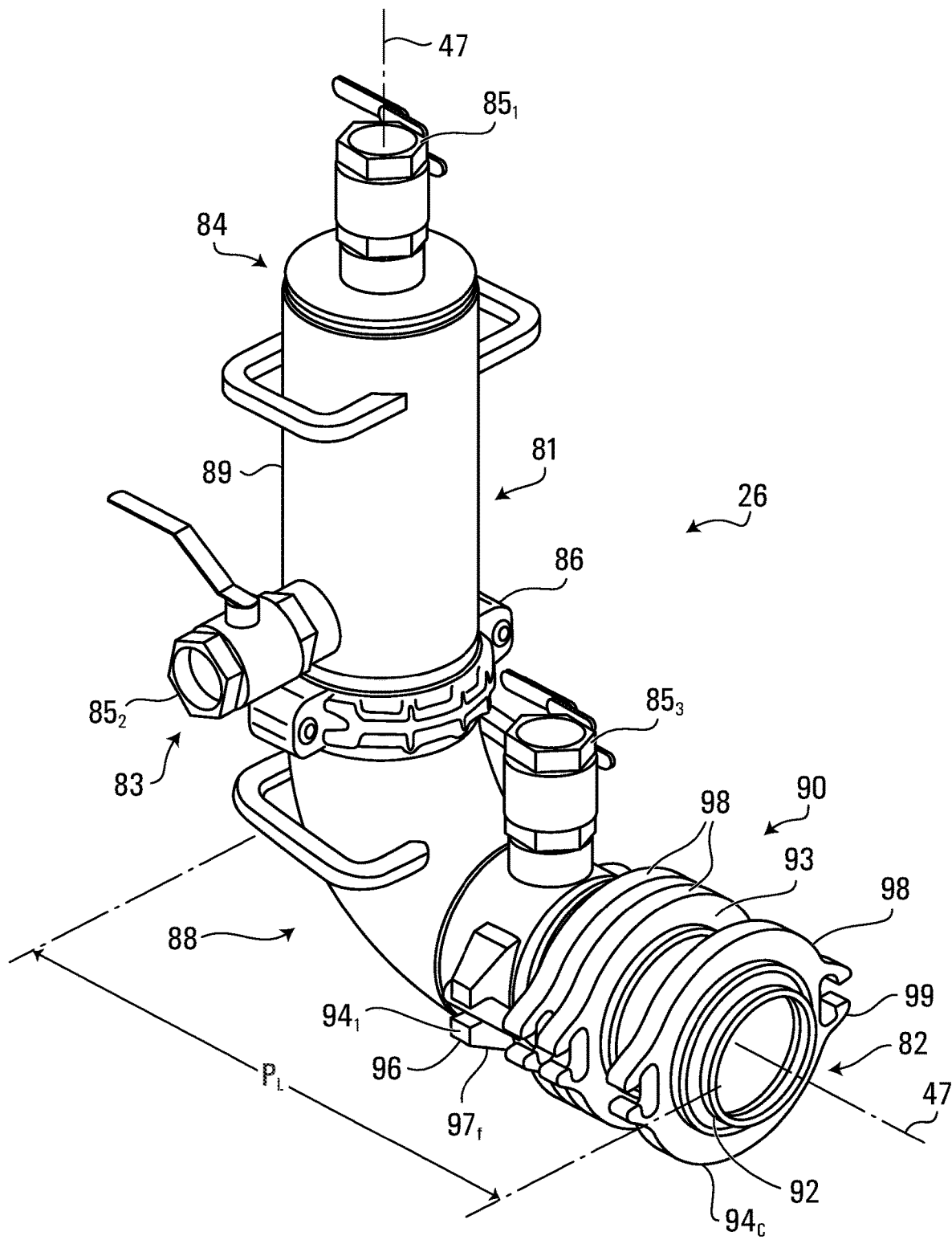
FIG. 7 shows a catcher of the liner installation apparatus.

With further reference to FIGS. 6 and 7, in this embodiment, the liner installation apparatus 14 comprises a first end device 24 and a second end device 26 that are configured to be connected to the liner 20 respectively adjacent to the ends $35_1$, $35_2$ of the water pipe 10 and to put (i.e., pass, flow and/or otherwise provide) the liner-installing material 50 inside the liner 20. In this example, the first end device 24, which can be referred to as a "launcher", is configured to launch or otherwise send the liner-installing material 50, including the water 45 and the torpedo $22_x$, into the liner 20, for instance by some of the water 45 flowing behind the torpedo $22_x$. The second end device 26, which can be referred to as a "catcher", is configured to catch or otherwise receive the liner-installing material 50, including the water 45 and the torpedo $22_x$, from the liner 20. The launcher 24 and the catcher 26 are also configured to introduce, circulate and/or contain the water 45 during installation of the liner 20.

As further discussed below, in this embodiment, the launcher 24 and the catcher 26 allow the liner 20 to be installed, and thus the water pipe 10 to be rehabilitated, more efficiently. For example, the launcher 24 and the catcher 26 may allow the access pits $33_1$, $33_2$ to be smaller (e.g., as a result of their elbowed or other nonstraight shape). Also, the launcher 24 and the catcher 26 may facilitate testing, such as pressure-testing for watertightness once the liner 20 is installed. For instance, in this embodiment, the launcher 24 and the catcher 26 are configured to allow curing of the liner 20 inside the water pipe 10 and hydrostatic pressure testing of the liner 20, once the liner 20 is cured, while the launcher 24 and the catcher 26 are still connected to the liner 20. Thus, the launcher 24 and the catcher 26 are configured to allow curing of the liner 20 inside the water pipe 10 and hydrostatic pressure testing of the liner 20 without disconnecting the launcher 24 and the catcher 26 from the liner 20 (e.g., by allowing pressure-testing for watertightness directly from the launcher 24 and the catcher 26, without having to disconnect the launcher 24 and the catcher 26 from the liner 20, empty the water piper 10, and replace the launcher 24 and the catcher 26 by pressure caps, and fill the water pipe 10 with water for testing).

More particularly, in this embodiment, each of the launcher 24 and the catcher 26 includes a cavity 43 (i.e., a hollow space) to admit (e.g., receive, pass, contain, etc.) at least part of the liner-installing material 50. In this example, each of the launcher 24 and the catcher 26 comprises a tubular portion 79 defining its cavity 43 and a longitudinal axis 47. In this case, an inner surface 55 of each of the launcher 24 and the catcher 26 is substantially circular in cross-section. In other cases, the tubular portions 49 of the launcher 24 and the catcher 26 may comprise a cross-section having any other suitable shape (e.g., polygonal; partly straight and partly curved; etc.).

The launcher 24 is configured for holding the torpedo $22_x$ prior to launching it into the liner 20 by any suitable means. In this embodiment, the launcher 24 comprises a holding portion 61 for holding the torpedo $22_x$, a clamp 66 and an input 63 for receiving the water 45. In this embodiment, the water 45 is pressurized to a pre-determined pression. The pressurized water 45 may be configured to push the torpedo $22_x$ out of the launcher 24 and into the main cavity 28 of the liner 20.

In this embodiment, the launcher 24 comprises a first valve $65_1$. The first valve $65_1$ may be a ball valve, a solenoid, or any suitable valve. The first valve $65_1$ may also be partially openable, such as to control a pushing force on the torpedo $22_x$.

In this embodiment, the launcher 24 is non-straight. That is, the longitudinal axis 47 of the launcher 24 is not a straight line, but rather bends, i.e., is curved and/or angular, such that the longitudinal axis 47 of the launcher 24 in a proximal portion 62 of the launcher 24 that is closer to the end $35_1$ of the water pipe 10 is oriented differently than in a distal portion 64 of the launcher 24 that is farther from the end $35_1$ of the water pipe 10. Thus, the launcher 24 comprises a bend 68, which may be any curved or angular part, that causes its longitudinal axis 47 to be non-straight. In this example, the bend 68 is a 90° bend. In other words, the launcher 24 is L-shaped and the longitudinal axis 47 of the launcher 24 at the input 63 is perpendicular to the longitudinal axis 47 of the launcher 24 at the holding portion 61 of the launcher. In other examples, the bend 68 may be of any other degree (e.g., 45°), and/or the launcher 24 may include two or more bends. The launcher 24 may sometimes be referred to as an "elbow" launcher.

Accordingly, the longitudinal axis 47 of the launcher 24 diverges from the longitudinal axis 6 of the water pipe 10 from the proximal portion 62 of the launcher 24 towards the distal portion 64 of the launcher 24, and the longitudinal axis 47 of the launcher 24 in the proximal portion 62 of launcher 24 is substantially orthogonal to the longitudinal axis 47 of the launcher 24 in the distal portion 64 of the launcher 24.

In this embodiment, the launcher 24 has a dimension L configured to be in the longitudinal direction 6 of the water pipe 10 when the catcher 26 is assembled to the liner 20 and that dimension L of the launcher 24 is significantly reduced. For instance, in some embodiments, a ratio of the dimension L over the inner diameter of the pipe 10 may be no more than 1, in some embodiments no more than 1.5, in some embodiments no more than 2, in some embodiments even less.

The launcher 24 comprises a connector 70 configured to connect the launcher 24 to the liner 20. The connector 70 comprises an outer surface 72 that is configured to engage the inner surface 21 of the liner 20. In this embodiment, the connector 70 comprises a taper 73 such as to encourage a more water-tight connection between the connector 70 and the liner 20 and a reduced time of operation, thereby also encouraging a cost reduction. The taper 73 is configured to engage the liner 20 and allows connection of different diameters of liners to the connector 70. For instance, sin some cases, pipes of nominal diameters may have dimensions that do not exactly correspond to the nominal diameters and may be 0.5 cm, 1 cm or 2 cm over or under the nominal diameters. The taper 93 may address this variation of dimension and may allow a watertight connection with pipes of the same nominal diameter even if the pipes have different dimensions. More specifically, in this example, the taper 73 is a truncated conical part.

The connector 70 of the launcher 24 comprises connecting members $74_1$-$74_c$ to tighten the liner 20 to the outer surface 72. More specifically, the connecting members $74_1$-$74_c$ comprise a flange 76 projecting from the tubular portion 49 of the launcher 24 and a collar 79 comprising a conical inner surface 79 that is configured to engage the outer layer $15_1$ of the liner 20 and to tighten it to the outer surface 72 of the connector 70. The collar 78 may be configured to be used with liners of different diameters and/or may be removable and selectable from a plurality of collars $70_1$-$70_c$ to be used with liners of different diameters.

In this embodiment, the connecting members $74_1$-$74_c$ comprise a plurality of fasteners $77_1$-$77_f$ connecting the flange 76 to the collar 78 of the launcher 24. The fasteners $77_1$-$77_f$ may be adjustable, i.e., a length of the fasteners $77_1$-$77_f$ may be adjustable, such as to tighten the collar 78 to the outer surface 72 of the taper 73, thereby squeezing the liner 20 inbetween. In other words, the fasteners $77_1$-$77_f$ may be movable relative to the launcher 24 and to the liner 20. In this embodiment, the fasteners $77_1$-$77_f$ comprise thread fasteners to fasten the collar 78 to the flange 76, thereby squeezing the liner 20 inbetween, and are adjustable by being rotated. To avoid shearing the liner 20 while the fasteners $77_1$-$77_f$ tighten the collar over the liner 20 and the outer surface 72 of the taper 73, the fasteners $77_1$-$77_f$ may comprise a compression limiter. In this embodiment, the compression limiter is a torque limiter.

In this embodiment, the launcher 24 is configured to allow pressure tests to be performed directly after curing the liner 20 without removing the launcher 24 and without use of pressure caps. More specifically, the launcher 24 comprises a second valve $65_2$ spaced from the first valve $65_1$ along the longitudinal axis 47 of the launcher 24. The second valve $65_2$ may be a ball valve, a solenoid, or any suitable valve. The launcher 24 may be configured to allow the hydrostatic pressure testing of the liner at a pressure of at least 50 psi, in some embodiments of at least 100 psi, in some embodiments of at least 150 psi, in some embodiments even more.

The catcher 26 is configured for receiving and holding the torpedo $22_x$ after its launching into the liner 20 and after its travel through the main cavity 28 of the liner 20, which forces the liner 20 towards its final shape 41. In this embodiment, the catcher 26 comprises a receptacle portion 81 for receiving the torpedo $22_x$, a clamp 86 and an output 83 for emptying the liner 20 of the pressurized water 45. To this end, the catcher 26 comprises a first valve $85_1$. The first valve $85_1$ may be a ball valve, a solenoid, or any suitable valve.

The catcher 26 is configured to retain the torpedo 22 after the pressurized water 45 is being depressurized. To this end, the catcher 26 may comprise a second valve $85_2$ at an inner end of the receptacle portion 81 and spaced from the first valve $85_1$ along the longitudinal axis of the catcher 26. In some embodiments, the second valve $85_2$ may be a guillotine valve, a solenoid or any suitable king of valve.

In this embodiment, the catcher 26 is non-straight. That is, the longitudinal axis 47 of the catcher 26 is not a straight line, but rather bends, i.e., is curved and/or angular, such that the longitudinal axis 47 of the catcher 26 in a proximal portion 82 of the catcher 26 that is closer to the end $35_2$ of the water pipe 10 is oriented differently than in a distal portion 84 of the catcher 26 that is farther from the end $35_2$ of the water pipe 10. Thus, the catcher 26 comprises a bend 88, which may be any curved or angular part, that causes its longitudinal axis 47 to be non-straight. In this example, the bend 88 is a 90° bend. In other words, the catcher 26 is L-shaped and the longitudinal axis 47 of the catcher 26 at the output 83 is perpendicular to the longitudinal axis of the catcher 26 at the receptacle portion 81 of the catcher 26. In other examples, the bend 88 may be of any other degree (e.g., 45°), and/or the catcher 26 may include two or more bends $88_1$-$88_b$. The catcher 26 may sometimes be referred to as an "elbow" catcher.

Accordingly, the longitudinal axis 47 of the catcher 26 diverges from the longitudinal axis 6 of the water pipe 10 from the proximal portion 82 of the catcher 26 towards the distal portion 84 of the catcher 26. The longitudinal axis 47 of the catcher 26 in the proximal portion 82 of catcher 26 is substantially orthogonal to the longitudinal axis 47 of the catcher 26 in the distal portion 84 of the catcher 26.

In this embodiment, the catcher 26 has a dimension L configured to be in the longitudinal direction 6 of the water pipe 10 when the catcher 26 in assembled to the liner 20 and that dimension L of the catcher 26 is significantly reduced. For instance, in some embodiment, a ratio of the dimension L over the inner diameter of the pipe 10 may be no more than 3, in some embodiments no more than 2, in some embodiments no more than 1.5, in some embodiments even less (e.g., 1).

The catcher 26 comprises a connector 90 configured to connect the launcher to the liner 20. The connector 90 comprises an outer surface 92 that is configured to engage the inner surface 21 of the liner 20. In this embodiment, the connector 90 comprises a taper 93 such as to encourage a more water-tight connection between the connector 90 and the liner 20 and a reduced time of operation, thereby also encouraging a cost reduction. The taper 93 is configured to engage the liner 20 and allows connection of different diameters of liners to the connector 90. For instance, in some cases, pipes of nominal diameters may have dimensions that do not exactly correspond to the nominal diameters and may be 0.5 cm, 1 cm or 2 cm over or under the nominal diameters. The taper 93 may address this variation of dimension and may allow a watertight connection with pipes of the same nominal diameter even if the pipes have different dimensions. More specifically, in this example, the taper 93 is a truncated conical part.

The connector 90 of the catcher 26 comprises connecting members $94_1$-$94_m$ to tighten the liner 20 to the outer surface 92. More specifically, the connecting members $94_1$-$94_m$ comprise a flange 96 projecting from the tubular portion 49 of the catcher 26 and a collar 98 comprising a conical inner surface 99 that is configured to engage the outer layer $15_1$ of the liner 20 and tighten it to the outer surface 92 of the connector 90 of the catcher 26. The collar 98 may be configured to be used with liners of different diameters and/or may be removable and selectable from a plurality of collars $98_1$-$98_c$ to be used with liners of different diameters.

In this embodiment, the connecting members $94_1$-$94_m$ of the connector 90 of the catcher 26 comprise a plurality of fasteners $97_1$-$97_f$ connecting the flange 96 to the collar 98 of the catcher 26. The fasteners $97_1$-$97_f$ may be adjustable, i.e., a length of the fasteners $97_1$-$97_f$ may be adjustable, such as to tighten the collar 98 to the outer surface 92 of the taper 93, thereby squeezing the liner 20 inbetween. In other words, the fasteners $97_1$-$97_f$ may be movable relative to the catcher 26 and to the liner 20. In this embodiment, the fasteners $97_1$-$97_f$ comprise thread fasteners to fasten the collar 98 to the flange 96, thereby squeezing the liner 20 inbetween, and are adjustable by being rotated. To avoid shearing the liner 20 while the fasteners $97_1$-$97_f$ tighten the collar 98 over the liner 20 and the outer surface 92 of the taper 93, the fasteners $97_1$-$97_f$ may comprise a compression limiter. In this embodiment, the compression limiter is a torque limiter.

In this embodiment, the receptacle portion 81 of the catcher 26 comprises a chamber 89 to receive the torpedo $22_x$; and the chamber 89 is removable from the catcher 26.

In this embodiment, a majority of the components of the launcher 24 may be similar or identical to a corresponding component of the catcher 26, such that parts of an additional launcher can be used to replace a used or broken corresponding part of the catcher 26 and vice versa. Also, the launcher 24 is configured to be modifiable into a catcher if there is a desire to do so and the catcher 26 is configured to be modifiable into a launcher if there is a desire to do so.

In this embodiment, the catcher 26 is configured to allow pressure tests to be performed directly after curing the liner 20 without removing the launcher 24 and without use of pressure caps. More specifically, the catcher 26 comprises a third valve $85_3$ spaced from the first and second valves $85_1$, $85_2$ along the longitudinal axis 47 of the catcher 26. The third valve $85_3$ may be a ball valve, a solenoid, or any suitable valve. The catcher 26 may be configured to allow the hydrostatic pressure testing of the liner at a pressure of at least 50 psi, in some embodiments of at least 100 psi, in some embodiments of at least 150 psi, in some embodiments even more.

Figure 12:
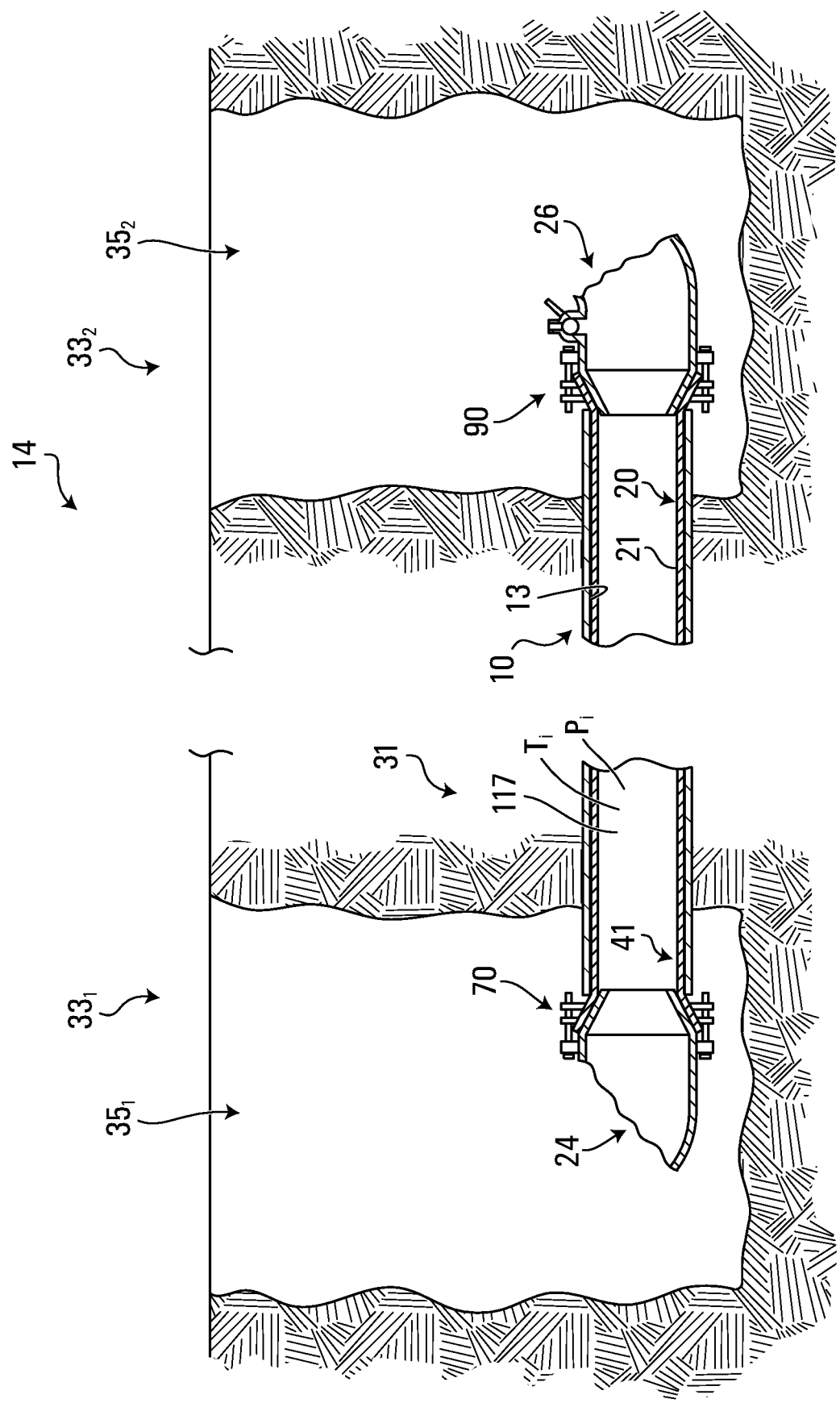
Figure 13:
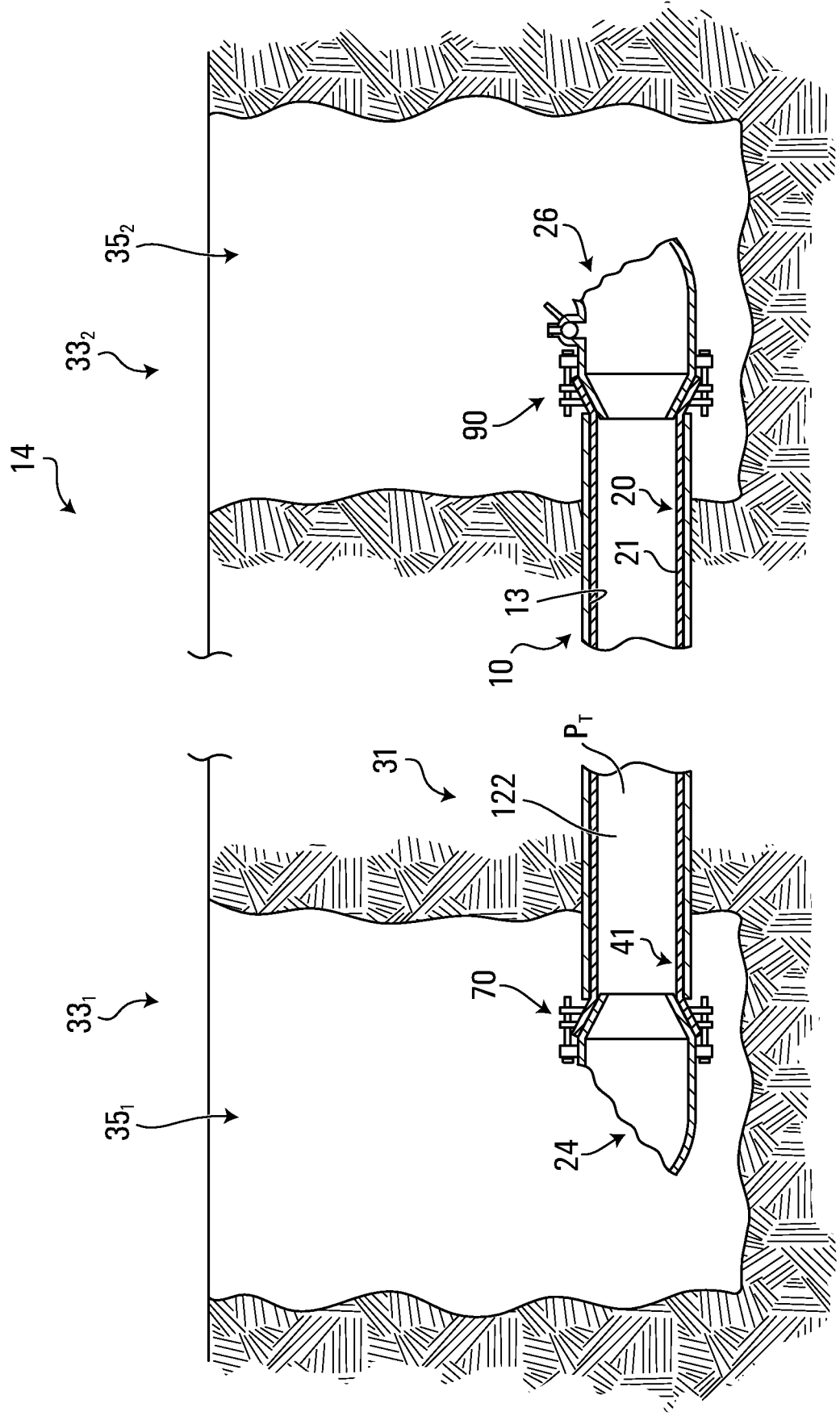

With additional reference to FIG. 12, once the torpedo $22_x$ has traveled through the liner 20 such that the liner 20 conforms to its final shape 41, the liner 20 may be cured, i.e., liquid or other fluidic components of the liner 20 (e.g., the resin 19) may be solidified. More specifically, in this embodiment, the cure is a thermally-activated crosslinking reaction. The liner installation apparatus 14 may use a liner-curing fluid 117 configured to cause the liner 20 to cure.

In this embodiment, the liner-curing fluid 117 is a liquid. More specifically, the liquid 117 is water.

Resin cure may comprise a first step of inputting water 117 at an initial temperature $T_i$ and pressurized at a first pre-determined pressure $P_i$ to wet the liner 20; a second step of heating the water 117 to a pre-determined curing temperature $T_C$ and pressurizing the water 117 to a second pre-determined curing pressure $P_C$; and an optional third step of letting the water 117 rest (i.e., without controlling temperature and pressure of the water 117) in the liner 20 to terminate the resin cure process. In this embodiment, at any stage the water 117 is circulated through the liner 20 (i.e., the water flows in the liner 20 and is not stagnant) in a close circuit network such as to better control the temperature of the water 117. In other embodiments, in at least some stages of the resin cure, flow of the water 117 may stop such that the water 117 does not flow into the liner 20 but rather remains stagnant.

The water 117 may have an initial temperature $T_i$ that is suitable to effectively wet the liner 20. For instance, in some embodiments, the initial temperature $T_i$ may be between normal temperature of water in the aqueduct system, i.e., typically between 4° C. and 20° C., in some embodiments between 20° C. and 40° C., and in some embodiments even more, e.g. between 40° C. and 100° C. The water 117 may be input into the main cavity 28 of the liner 20 using the valve $65_2$ of the launcher 24. Once the liner 20 is full of water 117, the water 117 may be pressurized to the first pre-determined pressure $P_i$ in order to effectively wet the liner 20. For instance, in some embodiments, the first pre-determined pressure $P_i$ may range between 5 psi and 50 psi and in some embodiments the first pre-determined pressure $P_i$ may range between 10 psi and 25 psi. The water 117 may remain at the initial temperature $T_i$ and first pre-determined pressure $P_i$ for a sufficient duration to ensure that the liner 20 is sufficiently wet. For instance, in some embodiments, the duration of the first step of the cure may be at least 0.5 hour, in some embodiments at least 1 hour, in some embodiments at least 2 hours, in some embodiments even more.

At the second step of the resin cure, the water 117 is heated and pressurized to the pre-determined curing temperature $T_C$ and second pre-determined curing pressure $P_C$, which are suitable for curing the resin 19 of the liner 20. For instance, in some embodiments, the pre-determined curing temperature $T_C$ may be between 20° C. and 100° C., in some embodiments between 50° C. and 80° C., in some embodiment about 65° C., and the second pre-determined curing pressure $P_c$ may range between 5 psi and 50 psi and in some embodiments the second pre-determined curing pressure $P_c$ may range between 10 psi and 25 psi. The second step of the resin cure may have a duration that is sufficiently long to ensure that the liquid and viscous components of the liner 20 are sufficiently solidified and optionally to ensure that chemical reactions of the curation are complete such as to better control the chemicals of the liner 20 that may contact the water 8 during use of the liner 20. Duration of the second step is defined as a duration between a first moment when the water 117 is heated to the pre-determined curing temperature $T_C$ and reaches an pre-determined acceptable temperature which may be equal or less (e.g., 5° C. less, 10° C. less, 15° C. less, 20° C. less, etc.) than the pre-determined curing temperature $T_C$; and a second moment when heating or otherwise controlling the temperature of the water towards the pre-determined curing temperature $T_C$ stops. In some embodiments, the duration of the second step of the cure may be at least 0.5 hour, in some embodiments at least 2 hours, in some embodiments at least 4 hours, in some embodiments even more.

In some embodiments, also, the liner 20 may be over-cured, i.e., may be cured at a higher temperature and/or during a long duration than required, to ensure that chemical reactions of the curation are complete such as to better control the chemicals of the liner 20 that may contact the water 8. For instance, in some embodiments, the duration of the curation may be at least 1.5 times the duration that is generally prescribed for the liquid and viscous components of the liner 20 in other applications, in some embodiments at least 3 times, in some embodiments at least 5 times, in some embodiments even more.

Alternatively or in addition to the thermal curing of the liner 20, resin crosslinking may be achieved using any other suitable method. For instance, in some embodiments, the liner 20 may be exposed to electromagnetic radiation of pre-determined intensity and of pre-determined wavelength in order to cure, e.g., microwave, ultraviolet, infrared, etc.

At the optional third step of the resin cure, which may alternatively be considered as a "period of post-curing", the water 117 may be circulated through the liner 20 without being heated during a suitable period of time to ensure that the liquid and viscous components of the liner 20 are sufficiently solidified and optionally to ensure that chemical reactions of the curation are complete such as to better control the chemicals of the liner 20 that may contact the water 8 during use of the liner 20. For instance, in some embodiments, duration of the third step may range between 1 hour and 48 hours, in some embodiments between 12 hours and 36 hours, in some embodiments about 24 hours.

Once resin cure of the liner 20 is completed, the liner 20 may be tested to ensure that it does not leak under normal or extreme conditions. More specifically, the liner installation apparatus 14 can use a pressurized fluid 122. In this embodiment, the pressurized fluid 122 is a liquid. More particularly, the liquid 122 is water.

The pressurized water 122 may be injected into the main cavity 28 of the liner 20 using one of the valves $65_2$, $85_3$ of the launcher 24 and catcher 26, while the other one of the valves $65_2$, $85_3$ remains closed. Pressure and duration of the pressurized water 122 may be controlled to ensure a standardization of the pressure tests. For instance, in some embodiments, a pressure $P_T$ may gradually reach at least 75 psi, in some embodiments at least 125 psi, in some embodiments at least 150 psi, in some embodiments even more. In some embodiments, high pressures are held during a duration $D_T$ of at least 30 minutes, in some embodiments during at least 60 minutes, in some embodiments during at least 120 minutes, in some embodiments during even longer. During these durations, if pressure diminishes while the valves $65_2$, $85_3$ are closed or connected to the pressurized-water source, there may be a failure or a leak in the liner 20 and therefore the liner 20 "fails" the pressure test. In some cases, a pre-determined loss of pressure or volume of water 122 may be judged acceptable, i.e., the liner 20 may "pass" the pressure test if a loss of pressure or water 122 doesn't exceed a pre-determined threshold. For instance, the pre-determined threshold may be a volume of lost water 122 that is determined relative to the length and diameter of the liner 20. That is, during the pressure test, a volume of water 122 may be "lost" or leaked, thereby diminishing the pressure inside the liner 20. In some embodiments, to observe the volume of lost water 122, water may be injected in the liner 20 after the duration $D_T$ until the pressure inside the liner 20 retrieves the pressure $P_T$ and one may observe the volume of water that is injected in the liner in order to retrieve the pressure $P_T$. The volume of water that is injected in the liner 20 in order to retrieve the pressure $P_T$ should approximately correspond to the volume of lost water 122.

In this embodiment, the launcher 24 and the catcher 26 are configured to be connected to the liner 20 such that, during the hydrostatic pressure testing, leakage of water 45 between the water pipe 10 and the inner surface 21 of the liner 20 is detectable. More specifically, in this embodiment, the launcher 24 and the catcher 26 are configured to be connected to the liner 20 such that, during the hydrostatic pressure testing, leakage of water 45 between the layers $15_1$, $15_2$ is detectable. This may be achieved by having the outer surfaces 72, 92 and the collars 78, 92 of the connectors 70, 90 to be configured to tighten a single layer $15_x$ of the liner 20, the connectors 70, 90 being free from engagement with the outer layer $15_1$. For instance, the outer surfaces 72, 92 and the collars 78, 98 of the connectors 70, 90 may be configured to tighten the inner layer $15_2$ of the water pipe 10. In order to do so, prior to connecting the launcher and catcher 24, 26 to the water pipe 10, a portion 53 of the water pipe 10 may be depraved from the outer layer $15_1$, from residual resin 19 between the layers $15_1$, $15_2$, and from any other layer. This may allow for instance to more efficiently test the efficiency, impermeability and resistance of the water pipe 10.

Having the launcher 24 and the catcher 26 non-straight and/or allowing pressure tests to be performed directly after curing the liner 20 without removing the launcher 24 or the catcher 26 and without use of pressure caps may provide multiple advantages. For instance, it may allow reducing the extent of the access pits $33_1$, $33_2$ that are required to be dug to rehabilitate the water pipe 10, thereby also reducing clutter and safety hazards in the access pits $33_1$, $33_2$. For instance, in some embodiments, a horizontal dimension $H_P$ of an access pit $33_2$ parallel to the longitudinal axis 6 of the water pipe 10 at the end $35_2$ of the water pipe 10 may be no more than 4 meters, in some embodiments no more than 3 meters, in some embodiments no more than 2.5 meters, in some cases even less. The horizontal dimension $H_P$ of the access pit $33_2$ parallel to the longitudinal axis 6 of the water pipe 10 at the end $35_2$ of the water pipe 10 may be less than a path length $P_L$ of the catcher 26, i.e., a length of a path that can be followed by the liner-installing material 50 in the catcher 26. For instance, in some embodiments, a ratio of the horizontal dimension $H_P$ of the access pit $33_2$ over the path length $P_L$ of the catcher 26 may be no more than 0.8, in some embodiments no more than 0.6, in some embodiments no more than 0.4, in some embodiments even less.

In this embodiment, once the liner is cured, tests can be performed to ensure that specifications of the liner (e.g.

structural stiffness, structural resistance, impermeability, thickness, inner/outer diameter, friction coefficient, etc.) are met.

Also, in this embodiment, once the liner is cured, input and output to and from auxiliary conduits may be restored by drilling an input/output aperture into the liner. More specifically, a device may drill the input/output aperture.

Although in embodiments considered above the liner installation apparatus 14 is used to rehabilitate the main conduit 10, in some embodiments, the liner installation apparatus 14 may be used to rehabilitate the auxiliary conduits $12_1$-$12_a$.

While in embodiments considered above the conduits 10, $12_1$-$12_a$ are shown to be straight, in some embodiments, the conduits 10, $12_1$-$12_a$ may comprise bends and elbows.

Although in embodiments considered above the conduits 10, $12_1$-$12_a$ are water pipes to transport potable water, in other embodiments, the conduits 10, $12_1$-$12_a$ may be to transport wastewater, oil, gas, or any other fluid (e.g., the fluid transport system 2 may be a sewer, a pipeline, etc.).

While in embodiments considered above the fluid 8, the liner-installing fluid 45 and the liner-curing fluid 117 are all water, in some embodiments, the fluid 8, the liner-installing fluid 45 and the liner-curing fluid 117 may be different from one another. For instance, one or more of the fluid 8, liner-installing fluid 45 and liner-curing fluid 117 may comprise steam, salt water, oil, and the like. For example, the liner-installing fluid 45 may be selected because of its specific viscosity to facilitate installation of the liner 20. For instance, in some embodiments, the liner-installing fluid 45 may have a viscosity between 0.1 cP and 100 cP, in some embodiments between 0.5 cP and 50 cP, and in some embodiments about 0.9 cP. As another example, the liner-curing fluid 117 may be selected because of its heat capacity and/or because of its thermal conductivity. For instance, in some embodiments, the liner-curing fluid 117 may have a heat capacity of at least 2 joules per gram and Kelvin and in some embodiments of at least 4 joules per gram and Kelvin and may also have a thermal conductivity of at least 0.1 Watt per meter and Kelvin, in some embodiments of at least 0.5 Watt per meter and Kelvin and in some embodiments of at least 1 Watt per meter and Kelvin.

Although in embodiments considered above the liner installation apparatus 14 comprises one torpedo $22_x$, in some embodiments, the liner 20 is extended using a plurality of torpedoes $22_1$-$22_t$ having different shapes and/or comprising different materials. For instance, first ones of the torpedoes $22_1$-$22_t$ may have smaller dimensions and/or softer materials than last ones of the torpedoes $22_1$-$22_t$. In other embodiments, the torpedoes $22_1$-$22_t$ each have a similar shape.

In other embodiments, the liner installation apparatus 14 may also be free of any torpedo $22_x$. For instance, instead of using a torpedo $22_x$ to expand the liner 20, the liner 20 may be expanded using only the water 45 inside the main cavity 28 of the liner 20. In some embodiments, the water 45 may be pressurized at a pressure of at least 100 psi, in some embodiments of at least 200 psi, in some embodiments of at least 300 psi, in some embodiment even higher.

Although in the embodiment the launcher 24 is configured to allow the apparatus to be used for installing the liner 20 in the water pipe 10, in some embodiments, the liner 20 may be a first liner $20_1$, the water pipe 10 may be a first water pipe $10_1$, and launcher may be configured to allow the apparatus to be used for installing a second liner $20_2$ in a second conduit $10_2$ differing in cross-sectional size from the first conduit $10_1$.

In some embodiments, any feature of any embodiment described herein may be used in combination with any feature of any other embodiment described herein.

Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

To facilitate the description, any reference numeral designating an element in one figure designates the same element if used in any other figures. In describing the embodiments, specific terminology has been resorted to for the sake of description but this is not intended to be limited to the specific terms so selected, and it is understood that each specific term comprises all equivalents.

In case of any discrepancy, inconsistency, or other difference between terms used herein and terms used in any document incorporated by reference herein, meanings of the terms used herein are to prevail and be used.

Although various embodiments have been illustrated, this was purposes of describing, but should not be limiting. Various modifications will become apparent to those skilled in the art.

The invention claimed is:

1. An apparatus for installing a liner inside a conduit to transport a fluid, the liner being curable inside the conduit, the apparatus comprising:
   a first end device configured to be connected to the liner adjacent to a first longitudinal end of the conduit; and
   a second end device configured to be connected to the liner adjacent to a second longitudinal end of the conduit spaced from the first longitudinal end of the conduit;
   wherein: the first end device and the second end device are configured to put liner-installing material including a liner-installing fluid inside the liner; and the first end device and the second end device are configured to allow curing of the liner inside the conduit and hydrostatic pressure testing of the liner while the first end device and the second end device are connected to the liner,
   wherein the first end device comprises a tapered part configured to engage the liner and wherein: the conduit is a first conduit; the liner is a first liner; and the tapered part of the first end device allows the apparatus to be used for installing a second liner inside a second conduit differing in cross-sectional size from the first conduit.

2. An apparatus for installing a liner inside a conduit to transport a fluid, the liner being curable inside the conduit, the apparatus comprising:
   a first end device configured to be connected to the liner adjacent to a first longitudinal end of the conduit; and
   a second end device configured to be connected to the liner adjacent to a second longitudinal end of the conduit spaced from the first longitudinal end of the conduit;
   wherein: the first end device and the second end device are configured to put liner-installing material including a liner-installing fluid inside the liner; and the first end device and the second end device are configured to allow curing of the liner inside the conduit and hydrostatic pressure testing of the liner while the first end device and the second end device are connected to the liner, wherein: the conduit is a first conduit; the liner is a first liner; and the first end device is configured to allow the apparatus to be used for installing a second liner in a second conduit differing in cross-sectional size from the first conduit.

3. An apparatus for installing a liner inside a conduit to transport a fluid, the liner being curable inside the conduit, the apparatus comprising:
a first end device configured to be connected to the liner adjacent to a first longitudinal end of the conduit; and
a second end device configured to be connected to the liner adjacent to a second longitudinal end of the conduit spaced from the first longitudinal end of the conduit;
wherein: the first end device and the second end device are configured to put liner-installing material including a liner-installing fluid inside the liner; and the first end device and the second end device are configured to allow curing of the liner inside the conduit and hydrostatic pressure testing of the liner while the first end device and the second end device are connected to the liner,
wherein the first end device comprises a connector configured to connect the first end device to the liner, wherein said connector of the first end device comprises a first connecting member and a second connecting member movable relative to the first connecting member of the first end device and the liner.

4. An apparatus for installing a liner inside a conduit to transport a fluid, the liner being curable inside the conduit, the apparatus comprising:
a first end device configured to be connected to the liner adjacent to a first longitudinal end of the conduit; and
a second end device configured to be connected to the liner adjacent to a second longitudinal end of the conduit spaced from the first longitudinal end of the conduit;
wherein: the first end device and the second end device are configured to put liner-installing material including a liner-installing fluid inside the liner; and the first end device and the second end device are configured to allow curing of the liner inside the conduit and hydrostatic pressure testing of the liner while the first end device and the second end device are connected to the liner,
wherein the first end device comprises a connector configured to connect the first end device to the liner, said connector of the first end device comprises a first connecting member and a second connecting member movable relative to the first connecting member of the first end device and the liner, and wherein the first end device comprises a tubular portion and the first connecting member of the first end device comprises a flange projecting from the tubular portion of the first end device.

5. An apparatus for installing a liner inside a conduit to transport a fluid, the liner being curable inside the conduit, the apparatus comprising:
a first end device configured to be connected to the liner adjacent to a first longitudinal end of the conduit; and
a second end device configured to be connected to the liner adjacent to a second longitudinal end of the conduit spaced from the first longitudinal end of the conduit;
wherein: the first end device and the second end device are configured to put liner-installing material including a liner-installing fluid inside the liner; and the first end device and the second end device are configured to allow curing of the liner inside the conduit and hydrostatic pressure testing of the liner while the first end device and the second end device are connected to the liner,
wherein the first end device comprises a connector configured to connect the first end device to the liner, said connector of the first end device comprises a first connecting member and a second connecting member movable relative to the first connecting member of the first end device and the liner, the first end device comprises a tubular portion and the first connecting member of the first end device comprises a flange projecting from the tubular portion of the first end device, and wherein the flange of the first connecting member of the first end device is fixed relative to the tubular portion of the first end device.

6. An apparatus for installing a liner inside a conduit to transport a fluid, the liner being curable inside the conduit, the apparatus comprising:
a first end device configured to be connected to the liner adjacent to a first longitudinal end of the conduit; and
a second end device configured to be connected to the liner adjacent to a second longitudinal end of the conduit spaced from the first longitudinal end of the conduit;
wherein: the first end device and the second end device are configured to put liner-installing material including a liner-installing fluid inside the liner; and the first end device and the second end device are configured to allow curing of the liner inside the conduit and hydrostatic pressure testing of the liner while the first end device and the second end device are connected to the liner,
wherein the first end device comprises a connector configured to connect the first end device to the liner, said connector of the first end device comprises a first connecting member and a second connecting member movable relative to the first connecting member of the first end device and the liner, and wherein the second connecting member of the first end device comprises a collar.

7. An apparatus for installing a liner inside a conduit to transport a fluid, the liner being curable inside the conduit, the apparatus comprising:
a first end device configured to be connected to the liner adjacent to a first longitudinal end of the conduit; and
a second end device configured to be connected to the liner adjacent to a second longitudinal end of the conduit spaced from the first longitudinal end of the conduit;
wherein: the first end device and the second end device are configured to put liner-installing material including a liner-installing fluid inside the liner; and the first end device and the second end device are configured to allow curing of the liner inside the conduit and hydrostatic pressure testing of the liner while the first end device and the second end device are connected to the liner,
wherein the first end device comprises a connector configured to connect the first end device to the liner, said connector of the first end device comprises a first connecting member and a second connecting member movable relative to the first connecting member of the first end device and the liner, and wherein the connector of the first end device comprises a threaded fastener to fasten the first connecting member of the first end device and the second connecting member of the first end device.

8. An apparatus for installing a liner inside a conduit to transport a fluid, the liner being curable inside the conduit, the apparatus comprising:
- a first end device configured to be connected to the liner adjacent to a first longitudinal end of the conduit; and
- a second end device configured to be connected to the liner adjacent to a second longitudinal end of the conduit spaced from the first longitudinal end of the conduit;
- wherein: the first end device and the second end device are configured to put liner-installing material including a liner-installing fluid inside the liner; and the first end device and the second end device are configured to allow curing of the liner inside the conduit and hydrostatic pressure testing of the liner while the first end device and the second end device are connected to the liner, wherein the first end device comprises a connector configured to connect the first end device to the liner, said connector of the first end device comprises a first connecting member and a second connecting member movable relative to the first connecting member of the first end device and the liner, and wherein the connector of the first end device comprises a third connecting member movable relative to the first connecting member of the first end device, the second connecting member of the first end device, and the liner.

9. An apparatus for installing a liner inside a conduit to transport a fluid, the liner being curable inside the conduit, the apparatus comprising:
- a first end device configured to be connected to the liner adjacent to a first longitudinal end of the conduit; and
- a second end device configured to be connected to the liner adjacent to a second longitudinal end of the conduit spaced from the first longitudinal end of the conduit;
- wherein: the first end device and the second end device are configured to put liner-installing material including a liner-installing fluid inside the liner; and the first end device and the second end device are configured to allow curing of the liner inside the conduit and hydrostatic pressure testing of the liner while the first end device and the second end device are connected to the liner, wherein the second end device comprises a connector configured to connect the second end device to the liner, said connector comprises a clamp and wherein the connector of the second end device comprises a first connecting member and a second connecting member movable relative to the first connecting member of the second end device and the liner.

10. An apparatus for installing a liner inside a conduit to transport a fluid, the liner being curable inside the conduit, the apparatus comprising:
- a first end device configured to be connected to the liner adjacent to a first longitudinal end of the conduit; and
- a second end device configured to be connected to the liner adjacent to a second longitudinal end of the conduit spaced from the first longitudinal end of the conduit;
- wherein: the first end device and the second end device are configured to put liner-installing material including a liner-installing fluid inside the liner; and the first end device and the second end device are configured to allow curing of the liner inside the conduit and hydrostatic pressure testing of the liner while the first end device and the second end device are connected to the liner, wherein the second end device comprises a connector configured to connect the second end device to the liner, said connector comprises a clamp and a first connecting member and a second connecting member movable relative to the first connecting member of the second end device and the liner, and wherein the second end device comprises a tubular portion and the first connecting member of the second end device comprises a flange projecting from the tubular portion of the second end device.

11. An apparatus for installing liners inside conduits to transport fluids, the conduits differing in cross-sectional size, each liner being curable inside a respective one of the conduits, the apparatus comprising:
- a first end device configured to be connected to the liner adjacent to a first longitudinal end of the respective one of the conduits; and
- a second end device configured to be connected to the liner adjacent to a second longitudinal end of the respective one of the conduits spaced from the first longitudinal end of the respective one of the conduits;
- wherein: the first end device and the second end device are configured to put liner-installing material including a liner-installing fluid inside the liner; and the first end device and the second end device are usable with the conduits that differ in cross-sectional size.

12. A method for installing liners inside conduits to transport fluids, the conduits differing in cross-sectional size, each liner being curable inside a respective one of the conduits, the method comprising:
- connecting a first end device to a first one of the liners adjacent to a first longitudinal end of a first one of the conduits;
- connecting a second end device to the first one of the liners adjacent to a second longitudinal end of the first one of the conduits spaced from the first longitudinal end of the first one of the conduits;
- using the first end device and the second end device to put liner-installing material including a liner-installing fluid inside the first one of the liners in the first one of the conduits;
- curing the first one of the liners inside the first one of the conduits;
- connecting the first end device to a second one of the liners adjacent to a first longitudinal end of a second one of the conduits;
- connecting the second end device to the second one of the liners adjacent to a second longitudinal end of the second one of the conduits spaced from the first longitudinal end of the second one of the conduits;
- using the first end device and the second end device to put liner-installing material including a liner-installing fluid inside the second one of the liners in the second one of the conduits; and
- curing the second one of the liners inside the second one of the conduits.

* * * * *